United States Patent
Ahmad et al.

(10) Patent No.: US 12,160,804 B2
(45) Date of Patent: Dec. 3, 2024

(54) V2X TRAFFIC MANEUVER HANDSHAKING BETWEEN TRAFFIC PARTICIPANTS

(71) Applicant: FORD GLOBAL TECHNOLOGIES, LLC, Dearborn, MI (US)

(72) Inventors: Syed Amaar Ahmad, Canton, MI (US); Ivan Vukovic, Birmingham, MI (US); Azin Neishaboori, Plymouth, MI (US); John Walpuck, West Bloomfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 408 days.

(21) Appl. No.: 16/787,739

(22) Filed: Feb. 11, 2020

(65) Prior Publication Data

US 2021/0245758 A1 Aug. 12, 2021

(51) Int. Cl.
*H04W 4/46* (2018.01)
*B60W 30/095* (2012.01)
(Continued)

(52) U.S. Cl.
CPC .......... *H04W 4/46* (2018.02); *B60W 30/0956* (2013.01); *B60W 30/18163* (2013.01);
(Continued)

(58) Field of Classification Search
CPC ....... B60W 30/18163; B60W 30/0956; B60W 2554/4045; B60W 50/14; B60W 2556/50;
(Continued)

(56) References Cited

U.S. PATENT DOCUMENTS 9,513,627 B1 12/2016 Elazary et al.
2013/0325306 A1* 12/2013 Caveney ........... B60W 30/0953
701/117
(Continued)

OTHER PUBLICATIONS

Nie et al., Decentralized Cooperative Lane-Changing Decision-Making for Connected Autonomous Vehicles, IEEE Access, Jan. 2017.
(Continued)

*Primary Examiner* — Angela Y Ortiz
*Assistant Examiner* — Aarron E Santos
(74) *Attorney, Agent, or Firm* — Joseph Zane; Brooks Kushman P.C.

(57) ABSTRACT

A vehicle broadcasts a lane change intent message indicating parameters of a maneuver to be performed by the vehicle operating as a main traffic participant vehicle, the maneuver requiring use of a road resource. Response messages are received from recipient vehicles indicating approval or disapproval of performance of the maneuver. Responsive to one of the recipient vehicles returning a response message indicating conflict with use of the road resource required for performance of the maneuver, a conflict resolution procedure is performed between the main traffic participant vehicle and the conflicted recipient vehicle, the conflict resolution procedure using a pre-agreed identical conflict resolution algorithm executed on each of the main traffic participant vehicle and the conflicted recipient vehicle to each make a same distributed decision whether to proceed with the maneuver.

21 Claims, 11 Drawing Sheets

(51) Int. Cl.
*B60W 30/18* (2012.01)
*G08G 1/16* (2006.01)
(52) U.S. Cl.
CPC ............. *G08G 1/162* (2013.01); *G08G 1/166* (2013.01); *G08G 1/167* (2013.01); *B60W 2554/4045* (2020.02)
(58) Field of Classification Search
CPC .. B60W 2554/00; B60W 30/09; B60W 10/20; B60W 2555/60; B60W 2556/65; B60W 2050/146; B60W 2520/10; B60W 30/095; B60W 30/06; B60W 40/02; B60W 2420/42; B60W 2556/10; B60W 40/04; B60W 40/08; B60W 2040/0818; B60W 2555/20; B60W 2554/80; B60W 2556/45; B60W 40/09; B60W 10/04; B60W 2420/52; B60W 2554/4041; B60W 30/0953; B60W 2552/00; B60W 2720/10; B60W 60/0011; B60W 10/184; B60W 2050/0075; B60W 2050/143; B60W 2556/00; B60W 30/08; B60W 2050/0031; B60W 2554/804; B60W 30/143; B60W 30/12; B60W 60/0015; B60W 2540/229; B60W 2554/801; B60W 2556/55; B60W 40/10; B60W 50/0097; B60W 50/0205; B60W 50/16; B60W 60/001; B60W 60/0053; B60W 2050/0005; B60W 2540/10; B60W 2540/12; B60W 30/181; B60W 50/00; B60W 50/082; B60W 10/10; B60W 2050/0029; B60W 2050/006; B60W 2756/10; B60W 30/14; B60W 40/105; B60W 10/18; B60W 2540/18; B60W 2540/221; B60W 2554/20; B60W 2554/802; B60W 2556/40; B60W 2710/18; B60W 2710/20; B60W 30/16; B60W 50/10; B60W 60/0017; B60W 60/0057; B60W 10/08; B60W 20/12; B60W 2040/1315; B60W 2050/0002; B60W 2050/0292; B60W 2540/215; B60W 2540/223; B60W 2552/30; B60W 30/00; B60W 30/02; B60W 30/10; B60W 30/165; B60W 30/18009; B60W 30/18145; B60W 40/107; B60W 40/12; B60W 50/035; B60W 50/045; B60W 10/06; B60W 2050/0025; B60W 2050/0043; B60W 2050/007; B60W 2300/125; B60W 2510/18; B60W 2520/105; B60W 2555/00; B60W 2556/60; B60W 2710/00; B60W 2754/30; B60W 30/18154; B60W 40/06; B60W 50/12; B60W 60/0025; B60W 60/007; B60W 10/11; B60W 10/26; B60W 20/11; B60W 2040/0881; B60W 2050/0071; B60W 2050/0072; B60W 2420/403; B60W 2422/00; B60W 2510/244; B60W 2540/225; B60W 2552/15; B60W 2552/20; B60W 2552/25; B60W 2554/4049; B60W 2710/207; B60W 2720/106; B60W 2720/24; B60W 2754/10; B60W 2754/50; B60W 30/146; B60W 30/18027; B60W 30/182; B60W 30/1882; B60W 40/00; B60W 50/08; B60W 50/087; B60W 60/0027; B60W 60/00274; B60W 60/005; B60W 60/0059; B60W 10/02; B60W 10/30; B60W 20/14; B60W 20/40; B60W 2040/0809; B60W 2040/0827; B60W 2040/0836; B60W 2040/0845; B60W 2040/0872; B60W 2050/0019; B60W 2050/0083; B60W 2050/009; B60W 2050/0096; B60W 2300/126; B60W 2420/00; B60W 2420/54; B60W 2530/00; B60W 2540/00; B60W 2540/043; B60W 2540/21; B60W 2540/227; B60W 2540/30; B60W 2552/50; B60W 2554/40; B60W 2554/4029; B60W 2556/05; B60W 2710/06; B60W 2710/08; B60W 2710/1005; B60W 2710/202; B60W 2754/20; B60W 30/085; B60W 30/17; B60W 30/18054; B60W 30/18127; B60W 50/0098; B60W 50/04; B60W 50/085; B60W 60/00; B60W 60/0016; B60W 60/00276; B60W 60/0061; B60Q 1/525; B60Q 3/14; B60Q 3/16; B60Q 3/18; B60Q 3/64; B60Q 9/00; B60Q 1/323; B60Q 1/34; B60Q 1/46; B60Q 1/50; B60Q 1/503; B60Q 2300/43; B60Q 2300/45; B60Q 2900/30; B60Q 5/00; B60Q 5/005; G08G 1/162; G08G 1/166; G08G 1/167; G08G 1/096725; G08G 1/0112; G08G 1/164; G08G 1/0116; G08G 1/0133; G08G 1/096775; G08G 1/0141; G08G 1/04; G08G 1/0145; G08G 1/096791; G08G 1/096758; G08G 1/163; G08G 1/096741; G08G 1/096844; G08G 1/012; G08G 1/0965; G08G 1/096827; G08G 1/14; G08G 1/161; G08G 1/096783; G08G 1/096716; G08G 1/168; G08G 1/005; G08G 1/0129; G08G 1/095; G08G 1/146; G08G 1/22; G08G 1/065; G08G 1/08; G08G 1/096822; G08G 1/096838; G08G 1/143; G08G 1/056; G08G 1/091; G08G 1/0962; G08G 1/096811; G08G 1/16; G08G 1/165; G08G 1/205; G08G 1/00; G08G 1/0125; G08G 1/017; G08G 1/07; G08G 1/087; G08G 1/0104; G08G 1/096861; G08G 1/096872; G08G 1/096888; G08G 1/20; G08G 1/042; G08G 1/096708; G08G 1/09675; G08G 1/096805; G08G 1/096816; G08G 1/096833; G08G 1/096883; G08G 1/148; G08G 1/149; G08G 1/0137; G08G 1/0967; G08G 1/01; G08G 1/09; G08G 1/093; G08G 1/096855; H04W 4/46; H04W 4/06; H04W 4/44; H04W 24/04; H04W 4/40; H04W 4/38; H04W 4/02; H04W 4/024; H04W 4/029; H04W 4/90; H04W 84/18; H04W 4/50; H04W 4/70; H04W 28/14; H04W 4/027; H04W 4/48; H04W 84/005; H04W 88/06; H04W 4/08; H04W 24/02; H04W 4/023; H04W 4/80; H04W 74/00; H04W 74/004; H04W 74/006; H04W 88/08; H04W 36/08; H04W 36/30; H04W 36/38; H04W 4/021; H04W 4/025; H04W 4/20; H04W 48/10; H04W 48/20; H04W 72/20; H04W 72/23; H04W 76/10; H04W 8/005; H04W 8/24; H04W 88/02; H04W 88/04; H04W 92/18; H04L 5/0055

See application file for complete search history.

(56) References Cited

U.S. PATENT DOCUMENTS

| | | | |
|---|---|---|---|
| 2018/0322782 A1* | 11/2018 | Engel | G08G 1/163 |
| 2019/0064839 A1* | 2/2019 | Sakai | G05D 1/0212 |
| 2019/0098471 A1* | 3/2019 | Rech | G08G 1/22 |
| 2019/0206255 A1 | 7/2019 | Tao et al. | |
| 2020/0202706 A1* | 6/2020 | Chaves | G05D 1/0285 |
| 2020/0410851 A1* | 12/2020 | Saito | G08G 1/162 |
| 2021/0031800 A1* | 2/2021 | Fuchs | B60W 60/0011 |
| 2022/0262253 A1* | 8/2022 | Wu | G08G 1/167 |

OTHER PUBLICATIONS

An et al., Design of a Cooperative Lane Change Protocol for a Connected and Automated Vehicle Based on an Estimation of the Communication Delay, Sensors 2018, vol. 18, Issue 10, 3499.

\* cited by examiner

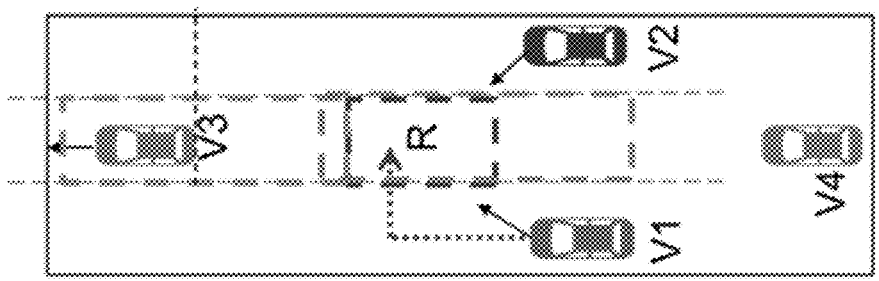
FIG. 15
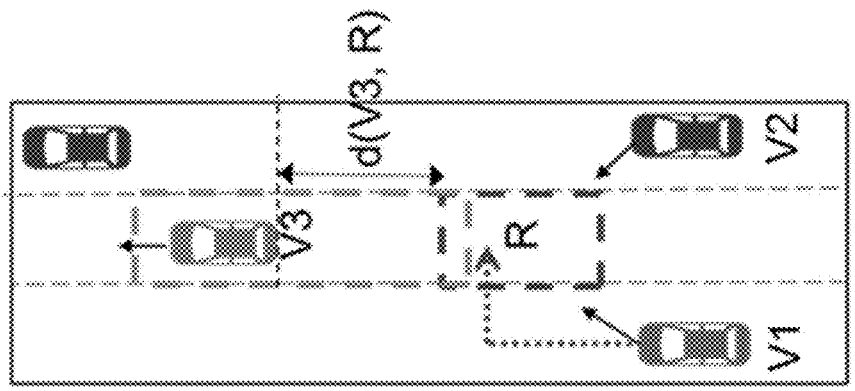
FIG. 14

V2X TRAFFIC MANEUVER HANDSHAKING BETWEEN TRAFFIC PARTICIPANTS

TECHNICAL FIELD

Aspects of the present disclosure generally relate to handshaking between traffic participants over vehicle-to-everything (V2X) communication, with regard to the performance of traffic maneuvers.

BACKGROUND

V2X communication allows vehicles to exchange information with other vehicles, as well as with infrastructure, pedestrians, networks, and other devices. Vehicle-to-infrastructure (V2I) communication enables applications to facilitate and speed up communication or transactions between vehicles and infrastructure.

SUMMARY

In one or more illustrative examples, a vehicle for performing traffic maneuvers, includes one or more controllers. The one or more controllers are programmed to broadcast, from the vehicle to one or more recipient vehicles, a lane change intent message, the lane change intent message indicating parameters of a maneuver to be performed by the vehicle operating as a main traffic participant vehicle, the maneuver requiring use of a road resource; receive, from the one or more recipient vehicles, one or more respective response messages indicating approval or disapproval of performance of the maneuver; responsive to the response messages all indicating approval of the maneuver, send a reservation message to at least the one or more recipient vehicles indicating that the main traffic participant vehicle is to perform the maneuver utilizing the road resource; and responsive to one of the recipient vehicles returning a response message indicating conflict with use of the road resource required for performance of the maneuver, perform a conflict resolution procedure between the main traffic participant vehicle and the conflicted recipient vehicle, the conflict resolution procedure using a pre-agreed identical conflict resolution algorithm executed on each of the main traffic participant vehicle and the conflicted recipient vehicle to each make a same distributed decision whether to proceed with the maneuver.

In one or more illustrative examples, a vehicle for vehicle for performing traffic maneuvers includes one or more controllers. The one or more controllers are programmed to receive, from a main traffic participant vehicle as a recipient vehicle, a lane change intent message, the lane change intent message indicating parameters of a maneuver to be performed by the main traffic participant vehicle, the maneuver requiring use of a road resource; and responsive to the road resource being required by the recipient vehicle, perform a conflict resolution procedure between the main traffic participant vehicle and the conflicted recipient vehicle, the conflict resolution procedure using a pre-agreed identical conflict resolution algorithm executed on each of the main traffic participant vehicle and the conflicted recipient vehicle to each make a same distributed decision whether to proceed with the maneuver.

In one or more illustrative examples, a method for performing traffic maneuvers, includes broadcasting, from a vehicle to one or more recipient vehicles, a lane change intent message, the lane change intent message indicating parameters of a maneuver to be performed by the vehicle operating as a main traffic participant vehicle, the maneuver requiring use of a road resource; receiving, from the one or more recipient vehicles, one or more respective response messages indicating approval or disapproval of performance of the maneuver; responsive to the response messages all indicating approval of the maneuver, sending a reservation message to at least the one or more recipient vehicles indicating that the main traffic participant vehicle is to perform the maneuver utilizing the road resource; and responsive to one of the recipient vehicles returning a response message indicating conflict with use of the road resource required for performance of the maneuver, performing a conflict resolution procedure between the main traffic participant vehicle and the conflicted recipient vehicle, the conflict resolution procedure using a pre-agreed identical conflict resolution algorithm executed on each of the main traffic participant vehicle and the conflicted recipient vehicle to each make a same distributed decision whether to proceed with the maneuver.

BRIEF DESCRIPTION OF THE DRAWINGS

FIG. 14 illustrates an example diagram of a lane change in the presence of a vehicle ahead scenario;

FIG. 15 illustrates an example diagram of a lane change in the presence of a vehicle ahead and behind scenario;

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

Through V2X communication, complex interactions between vehicles may be performed. One illustrative example is the performance of a coordinated cooperative lane change. An initiating traffic participant may send a request to perform a maneuver, such as a lane change or a merge into a lane (e.g., to move towards an exit, to avoid a traffic incident, avoid a roadblock, lane merge, etc.). Maneuvers may be performed, for instance, by vehicles using (i) on/off ramps, (ii) straight lanes, and/or (iii) any general adjustment of vehicle orientation. The intent of the initiating traffic participant to make the maneuver is shared with other traffic participants potentially involved in the maneuver. The informed traffic participants indicate agreement or disagreement of the planned maneuver of the initiating traffic participant. The participants may then carry out the negotiated maneuvers.

To do so, a handshaking communication protocol is described. The protocol is robust and provides guarantee that parties either agree to a maneuver or do not maneuver if there are wireless packet losses or ambiguity about intent. Moreover, techniques are described to provide for a fair allocation of road resources in this complex interaction and avoid communicating with other unnecessary vehicles. Additionally, multiple possible maneuver sharing contents are constructed, ranging from a maneuver path to simply a desired location within a deadline.

Figure 1:
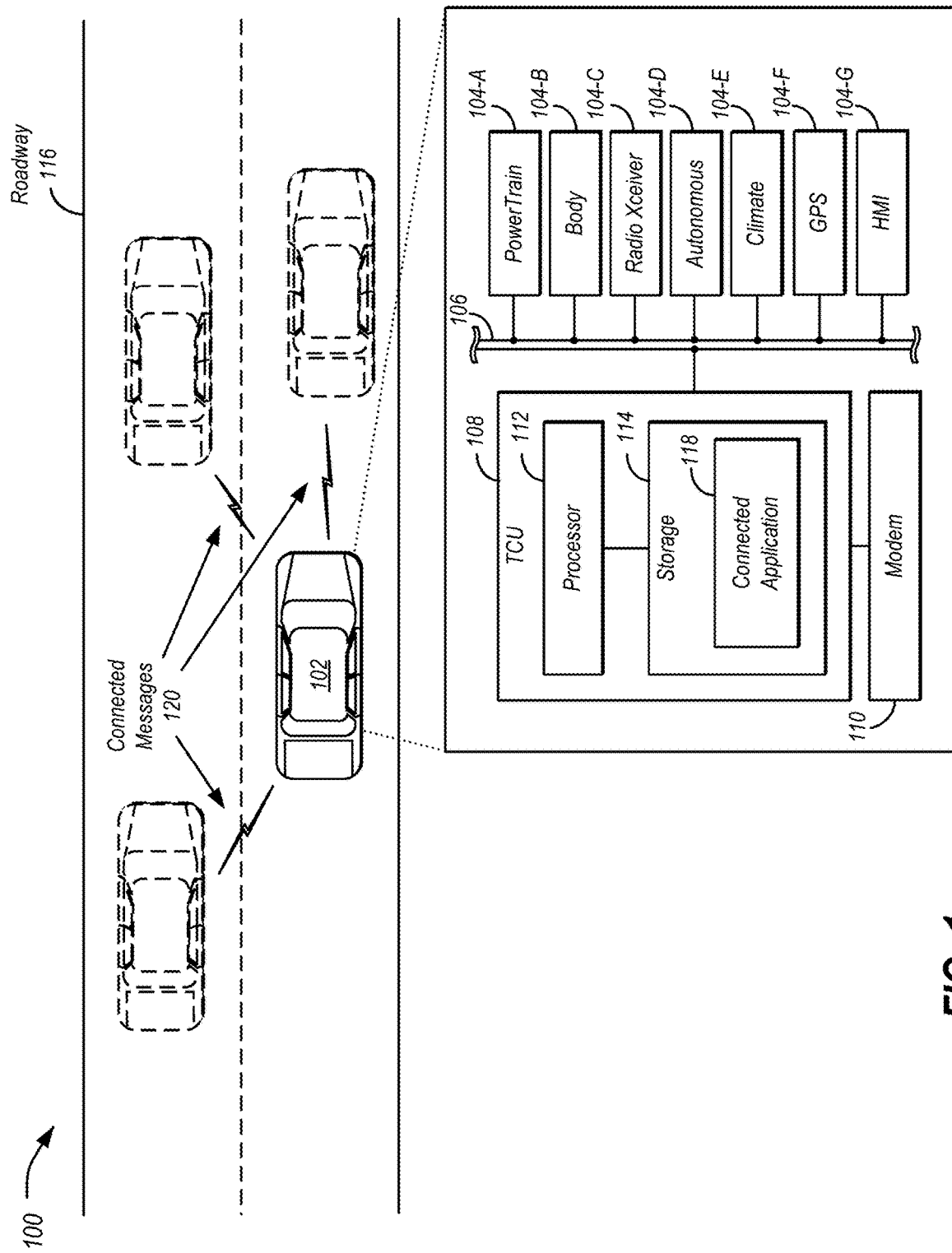
FIG. 1 illustrates an example system for the performance of cooperative maneuvers including vehicles traversing a roadway.

FIG. 1 illustrates an example system 100 for the performance of cooperative maneuvers including vehicles 102 traversing a roadway 116. The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). Alternatively, the vehicle 102 may be an Automated Vehicle (AV). The level of automation may vary between variant levels of Driver Assistance technology to a fully automatic, driverless vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as VINs. It should be noted that while vehicles 102 are being used as examples of traffic participants, other types of traffic participants may additionally or alternately be used, such as bicycles, scooters, and pedestrians, which may be equipped with V2X technology.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104-A through 104-G. However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104-A may be configured to provide control of engine operating components (e.g., idle control components, fuel delivery components, emissions control components, etc.) and for monitoring status of such engine operating components (e.g., status of engine codes); a body controller 104-B may be configured to manage various power control functions such as exterior lighting, interior lighting, keyless entry, remote start, and point of access status verification (e.g., closure status of the hood, doors and/or trunk of the vehicle 102); a radio transceiver controller 104-C may be configured to communicate with key fobs, mobile devices, or other local vehicle 102 devices; an autonomous controller 104-D may be configured to provide commands to control the powertrain, steering, or other aspects of the vehicle 102; a climate control management controller 104-E may be configured to provide control of heating and cooling system components (e.g., compressor clutch, blower fan, temperature sensors, etc.); a global positioning system (GPS) controller 104-F may be configured to provide vehicle location information; and a human-machine interface (HMI) controller 104-G may be configured to receive user input via various buttons or other controls, as well as provide vehicle status information to a driver, such as fuel level information, engine operating temperature information, and current location of the vehicle 102.

The vehicle bus 106 may include various methods of communication available between the vehicle controllers 104, as well as between the TCU 108 and the vehicle controllers 104. As some non-limiting examples, the vehicle bus 106 may include one or more of a vehicle controller area network (CAN), an Ethernet network, and a media-oriented system transfer (MOST) network. Further aspects of the layout and number of vehicle buses 106 are discussed in further detail below.

The TCU 108 may include network hardware configured to facilitate communication between the vehicle controllers 104 and with other devices of the system 100. For example, the TCU 108 may include or otherwise access a cellular modem 110 configured to facilitate communication with other vehicles 102 or with infrastructure. The TCU 108 may, accordingly, be configured to communicate over various protocols, such as with a communication network over a network protocol (such as Uu). The TCU 108 may, additionally, be configured to communicate over a broadcast peer-to-peer protocol (such as PC5), to facilitate C-V2X communications with devices such as other vehicles 102. It should be noted that these protocols are merely examples, and different peer-to-peer and/or cellular technologies may be used.

The TCU 108 may include various types of computing apparatus in support of performance of the functions of the TCU 108 described herein. In an example, the TCU 108 may include one or more processors 112 configured to execute computer instructions, and a storage 114 medium on which the computer-executable instructions and/or data may be maintained. A computer-readable storage medium (also referred to as a processor-readable medium or storage 114) includes any non-transitory (e.g., tangible) medium that participates in providing data (e.g., instructions) that may be read by a computer (e.g., by the processor(s)). In general, the processor 112 receives instructions and/or data, e.g., from the storage 114, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, PYTHON, JAVA SCRIPT, PERL, PL/SQL, etc.

The TCU 108 may be configured to include one or more interfaces from which vehicle information may be sent and received. In an example, the TCU 108 may be configured to facilitate the collection of connected vehicle data and/or other vehicle information from the vehicle controllers 104 connected to the one or more vehicle buses 106. While only a single bus 106 is illustrated, it should be noted that in many examples, multiple vehicle buses 106 are included, with a subset of the controllers 104 connected to each bus 106. Accordingly, to access a given controller 104, the TCU 108 may be configured to maintain a mapping of which buses 106 are connected to which controllers 104, and to access the corresponding bus 106 for a controller 104 when communication with that particular controller 104 is desired.

The TCU 108 may be further configured to periodically transmit connected messages 120 for reception by other vehicles 102. For instance, the periodicity may be on the order of every ten milliseconds. The TCU 108 may be further configured to receive connected messages 120 from other vehicles 102. In an example, the management of sending and receiving of connected vehicle data may be handled by a connected application 118 executed by the TCU 108. The connected messages 120 may include collected information retrieved from the controllers 104 over the vehicle buses 106. In many examples, the collected information data may include information useful for autonomous vehicle operations or driver-assistance vehicle operations. The connected vehicle data information retrieved by the TCU 108 may include, as some non-limiting examples, latitude, longitude, time, heading angle, speed, lateral acceleration, longitudinal acceleration, yaw rate, throttle position, brake status, steering angle, headlight status, wiper status, external temperature, turn signal status, vehicle length, vehicle width, vehicle mass, and bumper height. The connected vehicle data information may also include, weather data (such as ambient temperature, ambient air pressure, etc.), traction control status, wiper status, or other vehicle status information (such as the status of exterior vehicle lights, type of vehicle, ABS system status, etc.). In one example, the connected messages 120 may take the form of BSM messages as described in the SAE J2735.

While not shown, in some examples traffic participants may additionally involve communication via one or more roadside units (RSUs). The RSU may be a device with processing capabilities and networking capabilities, and may be designed to be placed in proximity of the roadway 116 for use in communicating with the vehicles 102. In an example, the RSU may include hardware configured to communicate over the broadcast peer-to-peer protocol (such as PC5), to facilitate C-V2X communications with the vehicles 102. The RSU may, accordingly, be able to communicate with multiple vehicles 102 along a specific roadway 116 or in a specific area. The RSU may also have wired or wireless backhaul capability to allow for communication with other elements of a traffic control system, via e.g., Ethernet, or cellular connection to the cellular network infrastructure, for example over Uu interface.

As described in further detail, the connected application 118 may additionally handle messaging related to the lane change handshaking between traffic participants using vehicle-to-everything (V2X) communication.

Figure 2:
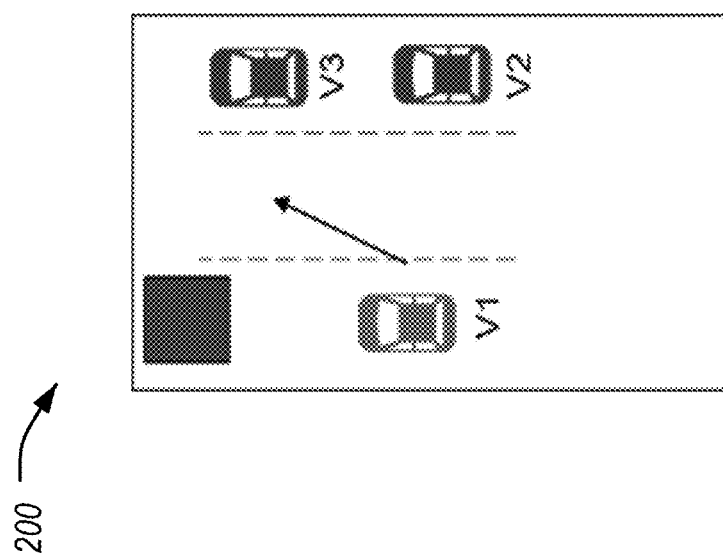
FIG. 2 illustrates an example situation in which a vehicle intends to perform a lane change maneuver along a roadway including additional vehicles.

FIG. 2 illustrates an example situation 200 in which a vehicle intends to perform a lane change maneuver along a roadway 116 including additional vehicles. As discussed herein the vehicles V1, V2 and V3 may be vehicles 102 as discussed above with respect to FIG. 1. As shown, a main traffic participant (i.e., the vehicle V1) intends to change lanes to avoid an obstacle. The vehicle V1 may determine that V2 and V3 are relevant to its lane change. Responsive to doing so, the vehicle V1 sends a Lane Change (LC) Intent message intended for these vehicles V2, V3. It should be noted that while the illustrated lane change is between lanes of the roadway 116, the discussion is also applicable to a lane merge situation, such as where the vehicle V1 intends to merge into a lane from an entrance or exit ramp.

Figure 3:
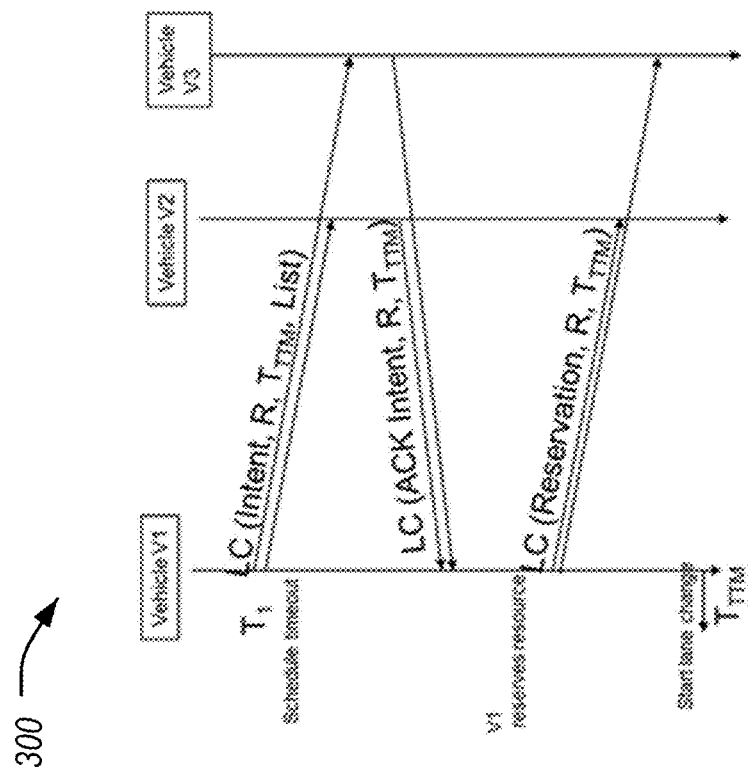
FIG. 3 illustrates an example idealized message flow corresponding to the lane change maneuver of the example situation.

FIG. 3 illustrates an example idealized message flow 300 corresponding to the lane change maneuver of the example situation 200. This idealized flow may sometimes be referred to as a sunny-day flow. As shown in FIG. 3, and with continuing reference to FIG. 2, the main traffic participant vehicle V1 elects to perform a maneuver such as a lane change (e.g., to move towards an exit, to avoid an incident, avoid a roadblock, lane merge, etc.). The vehicle V1 shares this intention with other traffic participants potentially involved in the maneuver (here shown as V2 and V3) as a Lane Change (LC) intent message. In response, informed traffic participants V2 and V3 may indicate support or decline of the planned maneuver to the main traffic participant V1. As shown in the idealized message flow 300, each of the recipient traffic participants V2 and V3 responds to the LC intent message with LC Acknowledgement (ACK) messages. The main traffic participant V1 may then inform the traffic participants informed in the intention message (or a superset including additional vehicles 102 not deemed necessary for approving the maneuver) whether the vehicle 102 V1 plans to perform the maneuver. This may be done in an LC Reservation message.

With reference to the LC intent message, the main traffic participant may set up the LC intent message to include various information. This information may include a vehicle identifier which may be used in order to allow other vehicles to relate the LC message to the vehicle 102 that transmitted the message. The LC intent message may optionally include current position, speed and heading of the transmitting vehicle 102.

The LC intent message may also optionally include a list of remote vehicles 102 involved in the maneuver (i.e., other vehicles 102 that are traffic participants to the maneuver. These listed vehicles 102 may be the vehicles 102 that should respond to the LC intent message. The list may be deduced from the periodic connected messages 120 received from other vehicles 102. For instance, the vehicles 102 whose locations are within a predefined distance to the vehicle 102 or to the intended path for the vehicle 102 may be indicated as being relevant participants.

The LC intent message may also include a message type. The message type may specify the type of maneuver the main traffic participant wants to perform, e.g., lane change, driving around obstacle into a neighboring lane without a lane change, crossing a road, performing a turn at an intersection, etc. The message may also include a deadline, denoted herein by $T_{TTM}$, which indicates a desired time by which the main traffic participant desires to begin the maneuver (TTM indicates Time-To-Maneuver).

The LC intent message may also include urgency information, which may be an indicator reflecting the need for the lane change or other type of move, e.g., to avoid an incident, to avoid a roadblock, to take an upcoming exit, etc. As one possibility, a vehicle traversing a ramp to perform a lane merge or lane exit may have a higher urgency to gain access to a road resource as compared to a vehicle traversing a multi-lane roadway. The LC intent message may also include a priority, which may be an indication of the priority of the vehicle intending to change lane, e.g., a police vehicle, a school bus, an ambulance, etc. . . . Additionally or alternatively, the LC intent message may also include other fields such as a nonce that may be used to determine how a conflict could be resolved if more than one vehicle intends to occupy the same relative position on the road. This could include, e.g., a randomly generated number.

With respect to the intent more specifically, the LC intent message may also include an indication of the intended path (or multiple potential intended paths) for main traffic participant vehicle 102. This may be specified, as some examples, as an intended path for the next x seconds in resolution y (e.g., the trajectory for the next 10 seconds with resolution of 100 msec), in the form of a set of way points each determined by their longitude/latitude, or as intended upcoming destination by its longitude/latitude and current distance to this upcoming intended destination. In some cases, the LC intent message may also include indications of intended paths or other operations to be performed by the recipient vehicles, such as speeding up or slowing down to make a gap for the main traffic participant vehicle.

The LC intent message may also specify a road resource, denoted herein by R, indicating the position on the road, relative to the current position of the main traffic participant vehicle 102, to which the main traffic participant vehicle 102 intends to move. It should be noted that road resources may be relative (e.g., some portion of roadway to allow for a lane change, although the specific portion of the roadway may vary), or absolute (e.g., a point that must be traversed within an intersection or at a lane merge point).

Also, the LC Intent message may include a feedback type which specifies the type of feedback that the main traffic participant is expecting (e.g., support/reject, which variant of a maneuver is preferred, additional information, etc.). The LC Intent message may also include a Maneuver ID, which is a number or other unique identifier used in the message exchanges pertaining to this lane change maneuver requested by the LC Intent message.

As noted above, the message exchange is initiated by the main traffic participant vehicle 102 sending the LC intent message to other traffic participants. Other vehicles 102 may then receive the LC intent message. A subset, ideally all, of these vehicles 102 are able to receive and process this LC intent message.

In response to the LC intent message, each participating vehicle 102 may create an LC response message to be returned to the main traffic participant vehicle 102. This LC Response message may include information including the maneuver ID from the LC intent message, a vehicle identifier of the responding vehicle 102, a message type (an ACK accepting the maneuver or a NACK rejecting the maneuver indicated in the LC intent message), as well as additional information (e.g., sensor information that might be relevant to road resource and/or lane change plan of the main traffic participant vehicle 102). The main traffic participant vehicle 102 may expect to receive the LC Response (ACK/NACK) within a predetermined interval timeout (which may be specified by the LC intent message). An ACK may be cumulative, incorporating ACKs overheard from other vehicles 102 in the list of traffic participants. In the case of no or partial response from traffic participants, the main participant vehicle 102 may repeat the LC intent request. In many examples, the LC response to intent message is broadcast. However, the LC response may alternatively be sent to the main traffic participant vehicle 102 as the intended recipient.

A NACK response may be of at least two types. In one case, the NACK may indicate a constraint pertinent to the intended maneuver, e.g., that an unequipped (or non-communicative) vehicle 102 is already occupying the space R and is not visible to the main traffic participant. As another case, the NACK may indicate a conflict of interest, e.g., another vehicle 102 is interested in the same road resource R. In this second case, the NACK also includes fields indicating at least deadline, urgency, and priority of the intended maneuver of the other vehicle 102.

The main traffic participant vehicle 102 may receive ACK/NACK responses from surrounding traffic participants and may process them. Based on this processing, the main traffic participant vehicle 102 makes a decision. If ACKs were received from all traffic participants, the main traffic participant vehicle 102 sends an LC Reservation message. If one or more ACKs were not received from all or a subset of traffic participants before timeout, but no NACK was received, then the main traffic participant vehicle 102 resends the lane change intent, or sends an LC Reservation message anyway. (The number of times the intent is sent before the default action is taken may be configurable.) If at least one NACK was received that indicated a constraint preventing the maneuver, the main traffic participant vehicle 102 aborts the maneuver. If at least one NACK was received that indicated a conflict of interest, a conflict resolution phase may be entered (discussed in detail below).

The LC reservation message may include information such as the maneuver ID, a vehicle identifier of the sending vehicle 102, a message type (e.g., a road reservation signaling the decision to maneuver), and a starting time for when the main traffic participant vehicle 102 plans to initiate the maneuver.

Figure 4:
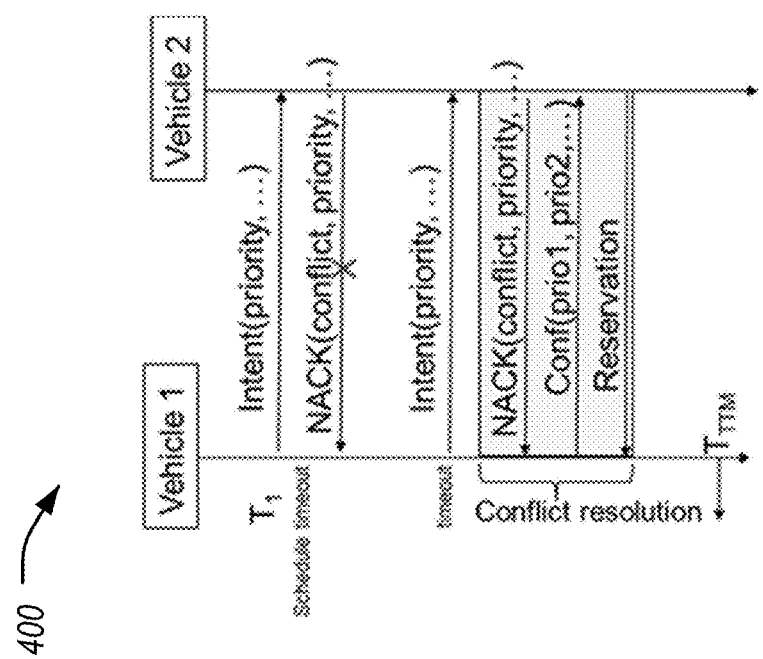
FIG. 4 illustrates an example message flow corresponding to the lane change maneuver of the example situation including a conflict and a loss of packet.

FIG. 4 illustrates an example message flow 400 corresponding to the lane change maneuver of the example situation 200 including a loss of packet and a conflict resolution. With respect to the loss of packet, the message flow 400 expands on the scenario illustrated in the idealized message flow 300 by further showing that the first LC Intent message is not responded to by the second vehicle 102 within the timeout period (which may be the result of packet loss of the LC Intent message, loss of the LC Response message, or a lack of response to a received LC Intent message). The main traffic participant vehicle 102 as shown addresses the citation by performing a retry of the sending of the LC Intent message after expiration of the timeout.

With respect to conflict, the message flow 400 further shows a possibility in which another traffic participant vehicle 102 requests resources. Additional messaging may then be used to perform the conflict resolution. In particular, a vehicle 102 having a conflict sends an LC Response NACK message indicating the conflict, as explained above. Responsive to receipt of the NACK indicating the conflict, the main traffic participant vehicle 102 may send the conflicted vehicle 102 a conflict confirmation (CC) message acknowledging and attempting to resolve the conflict. In response, the conflicted vehicle 102 may issue an LC reservation message back to the main traffic participant vehicle 102 that resolves the conflict and allows the maneuver to be performed.

As some notes, the main traffic participant vehicle 102 may set a timeout to receive the LC reservation message from the conflicted vehicle 102. If the LC reservation message is not received before the timeout expires, the conflict confirmation (CC) message may be re-sent. The conflicted vehicle V2 (i.e., not main traffic participant vehicle 102) may wait for a duration of time $T_{rx}$ to receive another conflict confirmation, absence of which indicates receipt of reservation by V1 (main participant). After verifying a full handshake (4-way), upon elapse of $T_{TTM}$, the maneuver may be performed.

With respect to synchronization, as traffic participants need to keep track of the elapsed time of $T_{TTM}$, a common time reference is required among the traffic participants. Continuing with reference to the message flow 400, it is assumed that a common clock is available to the vehicles 102 V1 and V2 (e.g., through global navigation satellite system (GNSS) messages). When the vehicles 102 V1 or V2 send their respective messages (Intent, Response ACK/NACK, CC, or Reservation), the exact timestamps at the moment of message generation are also embedded in the messages. This ensures that (i) both vehicles 102 are aware of the timing of the messages and (ii) the timestamps (similar to 'secmark' in a BSM) of intent, ACK/NACK, confirmation and reservation, respectively, are monotonically increasing in that sequence.

In case both vehicles 102 generate LC Intent messages within the same time period (e.g., within 10 milliseconds) and the same priority and have not yet received ACK/NACK, the vehicle 102 with the earlier timestamp may be accorded precedent.

GNSS outages or other exceptions that compromise a common clock may be handled, as a vehicle 102 may detect that the timestamp of a particular message is out of order. For instance, when a confirmation timestamp at vehicle 102 V1 is lower than the timestamp in the NACK from vehicle 102 V2, it implies that either or both clocks on vehicles 102 V1 and V2 are not synchronized. In such situations, vehicles 102 V1 and V2 can revert to a default action or abort the maneuver.

Regarding the loss of messages, if the vehicle 102 V1 does not receive within $T_{rx1}$ (a) NACK or ACK after sending Intent, or (b) receive Reservation after sending CC, the vehicle 102 V1 may resend these respective messages. If the vehicle 102 V2 receives a CC message within $T_{rx2}$ after sending a Reservation message, the vehicle 102 V2 resends Reservation message. Otherwise, the situation would mean that the vehicle 102 V1 has received the Reservation. If at any time before making the maneuver, the vehicle 102 V1 elects not to proceed with the intended maneuver, the vehicle 102 V1 may optionally send out a cancellation/abort message.

Figure 5:
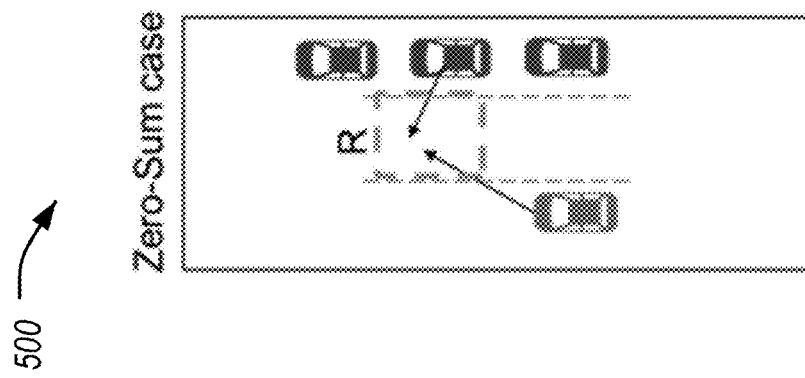
FIG. 5 illustrates an example diagram of a zero-sum conflict resolution scenario.

FIG. 5 illustrates an example diagram 500 of a zero-sum conflict resolution scenario. The zero-sum conflict resolution is one possible methodology for resolving a conflict between the traffic participants. In an example of such a scenario, there is a road resource R in a middle lane for which V1 and V2 compete. Because one party can win at the expense of the other, the resolution is zero-sum.

To perform the zero-sum conflict resolution scenario, an identical algorithm for conflict resolution decision is implemented in each traffic participant vehicle 102. Thus, two vehicles 102 that have the same input will reach an identical output (e.g., a consistent decision with respect to which vehicle 102 goes next). With reference to the example message flow 400, and with continuing reference to the example diagram 500, the Confirmation message sent by V1 may ensure that both V1 and V2 have the same input to the pre-agreed identical algorithm to make the distributed decision. The vehicle 102 that wins may send the Reservation message.

The confirmation message may include information including the maneuver ID, an identifier of the vehicle 102 sending the message, a Message type indicating that this is a confirmation message that is part of conflict resolution, and a list of inputs that the traffic participants will use in performing the conflict resolution decision, e.g., priority, urgency, deadline, etc.

The reservation message may be broadcast by the vehicle 102 V2 (the responder, not the initiating vehicle 102 with intent) and may include at least the maneuver ID, an identifier of the vehicle 102 sending the message, a Message type indicating that the message is a road reservation signaling a decision as to which vehicle 102 can make the maneuver. Notably, in this scenario the responder vehicle 102 V2 sends the Reservation message, regardless of which of V1 and V2 has been determined the winner based on the decision algorithm.

An objective of the conflict resolution procedure is to prevent the occurrence of a traffic incident. A road resource R remaining unused is undesirable, but acceptable to prevent occurrence of the incident. Validation of the incident-prevention aspects of the scheme may be confirmed by a review of the procedure. As discussed in further detail below with respect to FIG. 6, responsive to V2 receiving the intent message from V1, V2 has information indicative of the parameters of V1 and also the parameters of V2. Responsive to V1 receiving the NACK message from V2, V1 has information indicative of the parameters of V2 and also its own parameters. Responsive to V2 receiving the CC message from V1, V2 has information indicative of the parameters of V2. Responsive to V1 receiving the reservation message from V2, V1 has information that V2 has received the conflict confirmation message. At this point, both V1 and V2 have verified that V1 and V2 have identical inputs to the conflict resolution algorithm, resulting in identical output (determining the winner). The vehicle 102 determined as winner of the conflict resolution can maneuver, as having been dually verified.

Figure 6:
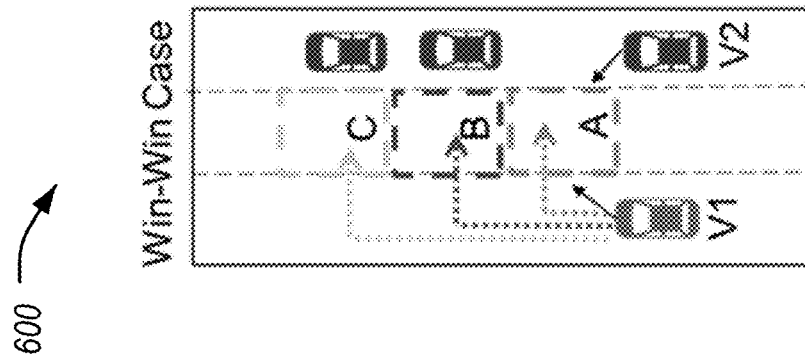
FIG. 6 illustrates an example diagram of a win-win conflict resolution scenario.

FIG. 6 illustrates an example diagram 600 of a win-win conflict resolution scenario. The win-win conflict resolution is another possible methodology for resolving a conflict between the traffic participants. As opposed to the zero-sum conflict resolution that decides access to a resource R, the win-win conflict resolution chooses among multiple sets of pathways.

The win-win conflict resolution procedures may make use of the cake-cutting algorithm, which is a fair-allocation game that identifies two different roles: a cake cutter party, and a cut selector party. The former and the latter parties are mutually exclusive. The cake cutter party cuts a given cake into two pieces. If the cake cutter makes unfair cuts, the cut selector can select the bigger piece. Thus, the cake cutter is incentivized to make a fair cut. This algorithm is customized and modified for vehicle maneuver use cases. In the present case, the cake cutting problem is modified to a set (that may include multiple possibilities). The cake cutter party devises the possible pathways, and the cut selector selects one pathway. The complementing subset to the pathway selected is allotted to the cake cutter party. In the win-win method for conflict resolution, the conflict confirmation signal includes the proposed set of pathways. A follow up message is sent by V2 that determines the selected pathway V1 needs to send an ACK to this message and confirm selection.

Similar to the zero-sum conflict resolution procedure, the general message sequence may be performed such that (i) the vehicle 102 V1 sends an LC Intent message, (ii) a recipient vehicle 102 such as V2 sends a NACK indicating contention, and (iii) the vehicle 102 V1 sends a conflict confirmation (CC) message. However, to allow for the choice between the multiple sets of pathways, the Intent, ACK, and CC messages contain additional information.

Figures 7, 8:
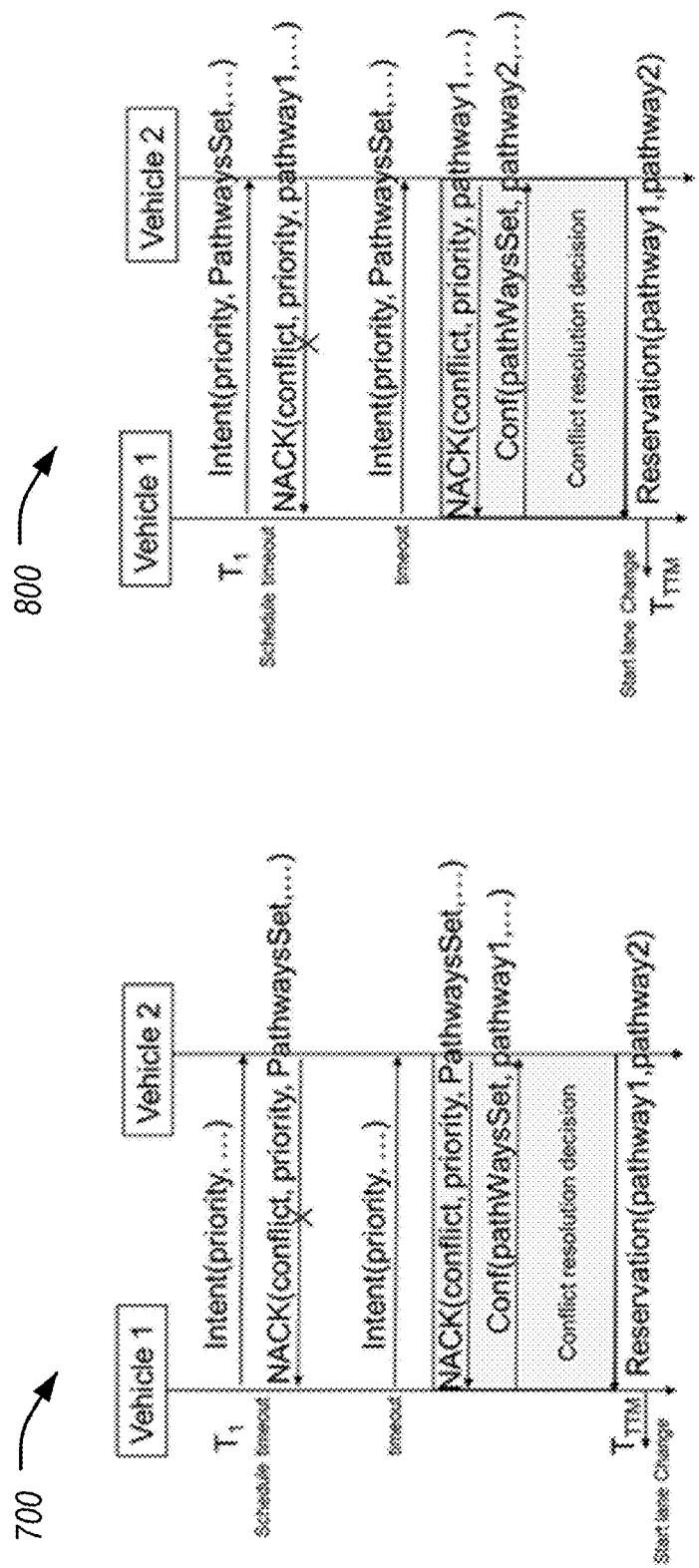
FIG. 7 illustrates an example message flow corresponding to the win-win conflict resolution scenario of FIG. 6, including a first win-win conflict resolution scheme.
FIG. 8 illustrates an alternate example message flow corresponding to the win-win conflict resolution scenario of FIG. 6, including a second win-win conflict resolution scheme.

FIG. 7 illustrates an example message flow 700 corresponding to the win-win conflict resolution scenario of the example 600, including a first win-win conflict resolution scheme. As shown, the vehicle 102 V1 sends an LC Intent message with fields similar to those previously described for the zero-sum conflict resolution procedure. In response to receipt of the LC Intent message, the vehicle 102 V2 sends a NACK message with fields similar to those previously described in zero-sum conflict resolution, but with the addition of a set of possible pathways P. In this first scheme, the vehicle 102 V2 is the cake cutter player in the cake-cutting algorithm (i.e., the vehicle V2 makes the cut, and the vehicle V1 chooses). Responding to the existence of a conflict between the intent of the vehicle 102 V1 and the operation of the vehicle 102 V2, the vehicle 102 V2 creates the set P including three proposed pathways: {A, 0B, 00C} (in the example, each letter denoting an alternate path, the "0" terminology denoting continuing motion in the current lane for the next L meters.). The vehicle 102 V2 returns this message including the set P back to the vehicle 102 V1. Having the set P, the vehicle 102 V1 chooses one of the possibilities, and sends a conflict confirmation message including one of the specific pathways s & P (e.g., A). Accordingly, the vehicle 102 V1 fulfills its role as cut selector in the cake-cutting algorithm. The vehicle 102 V2 receives the conflict confirmation messages, and in response, sends a reservation message that acknowledges the selected pathway of the vehicle 102 V1 and includes the selected pathway q of the vehicle 102 V2 selected from set {∀x∈P, x≠s}, e.g., 0B. With the conflict resolved, the vehicles 102 V1 and V2 may proceed.

FIG. 8 illustrates an alternate example message flow 800 corresponding to the win-win conflict resolution scenario of the example 600, including a second win-win conflict resolution scheme. As shown, the vehicle 102 V1 sends an LC intent with fields similar to those previously described in case A, plus a set of possible pathways P anticipating and provisioning a conflict of interest. As opposed to the scenario shown in the message flow 700, here, V1 is the cake cutter, not V2. Here, the vehicle 102 V1 creates the set P including three proposed pathways: again using the example of {A, 0b, 00C}. In response to receipt of the LC Intent message, the vehicle 102 V2 sends a NACK message with fields similar to those previously described in the zero-sum case, plus a specific pathway s∈P, e.g., A. Thus, here the vehicle 102 V2 is a cut selector in the cake-cutting algorithm. Responsive to receipt of the NACK message, the vehicle 102 V1 sends a conflict confirmation message that acknowledges the selected pathway from V2 and includes the selected pathway q selected by V1 from set {∀x∈P, x≠s}, e.g., 0B. Next, the vehicle 102 V2 sends a reservation message that includes the selected pathway q made by V2. With the conflict resolved, the vehicles 102 V1 and V2 may proceed.

It should be noted that if vehicle 102 V1 and vehicle 102 V2 almost simultaneously send an LC Intent message, the LC Intent message with the older timestamp may take priority. For example, if the timestamp of the LC Intent message sent by V1 is older, upon receiving the LC Intent message from the vehicle V1, the vehicle V2 sends a NACK to the LC Intent message from V1, but V2 does not resend its LC Intent message again.

Referring collectively to the first and second win-win conflict resolution schemes, the first scheme has the advantage that it allows a shorter LC Intent message, and does not require the vehicle 102 that is sending the initial LC Intent message to proactively consider possible pathways in case there would be a conflict of interest. However, regarding the second scheme, it has better coordinating features compared to the first scheme, as each of the pathway selected by one party are acknowledged by the other party. It should also be noted that in yet another example, V1 may send the list of options to V2 in the LC intent message, despite not being aware of the intended road resource of V2.

Figure 9:
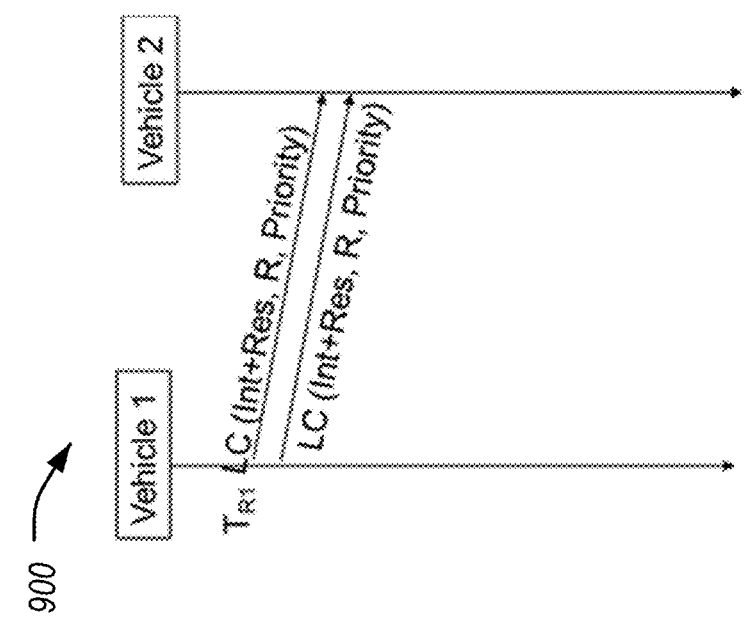
FIG. 9 illustrates an example message flow for performance of an urgent maneuver.

FIG. 9 illustrates an example message flow 900 for performance of an urgent maneuver. In this case, the main traffic participant vehicle 102 attempts to perform a lane change to prevent an incident occurring with another vehicle 102 or with a roadblock or other object. As shown, the message exchange is shortened, skipping multiple messages due to the urgency of the situation. The initial LC Intent message sent by the main traffic participant vehicle 102 indicates both intent and reservation. The remaining content of the LC Intent message is substantially similar to or the same as those listed in the other message flows. The LC Intent message may be sent multiple times and reinforced with HARQ to ensure its delivery and receipt by other traffic participants.

With respect to aborting maneuvers, such as the sunny-day scenario, the conflict resolution scenarios, or the urgent maneuver scenario, traffic participants may have a default (abort) maneuver option. In the zero-sum examples, a winner traffic participant may change intent and decide against performing the maneuver. To do so, the winner sends an abort message anytime to signal that vehicle 102 is going to perform a default action instead. In the win-win examples, any vehicle 102 may send the abort message to signal that the respective traffic participant is going to perform the default action. Other vehicles may elect to proceed as agreed. In the case of a negotiation not agreed until $T_{TTM}$ has elapsed, both (or all) traffic participants may execute their respective default actions. By default action, it is meant that both (or all) vehicles are on their own and take actions (such as keeping in their current lanes etc.).

With respect to post-conditions, in case of a decision to perform the lane change, the main traffic participant vehicle 102 initiates the maneuver at the time indicated in the reservation. Other vehicles 102 may take appropriate actions (possibly before the initiation time instant of the main traffic participant). In case of a decision not to perform the maneuver, traffic flows as before, without performing the maneuver. It should be noted that the traffic participants might decide to attempt similar or alternative maneuvers instead.

The methodology described herein may be useful in a variety of maneuver situations. For instance, for a cooperative lane change, the main traffic participant may be a host vehicle 102. The host vehicle 102 may intend to perform a lane change, but there may be remote vehicles 102 on the lane adjacent to the lane the host vehicle 102 wants to change to. To prevent two vehicles 102 simultaneously attempting to change lane, the host vehicle 102 sends a LC Intent message. The remote vehicle 102 receives it and after processing the message responds with an ACK indicating that the host vehicle 102 can proceed. Upon receiving the ACK, the host vehicle broadcasts a reservation message, and subsequently proceeds with the lane change.

In a high-priority lane change, the main traffic participant is a host vehicle 102. There is a vehicle 102 on course towards the host vehicle 102. The host vehicle 102 intends to perform a lane change to avoid the situation, but there are remote vehicles 102 on the lane adjacent to the lane the host vehicle 102 wants to change to. To prevent two vehicles 102 simultaneously attempting to change lane, the host vehicle 102 sends a lane change intent and reservation message. The remote vehicle 102 receives it and after processing the message response does not make a lane change. The host vehicle 102 proceeds with lane change.

In a road blockage scenario, one lane of a rural road is blocked by an obstacle or other traffic. The blocked vehicle 102 intends to change lanes and avoid coming to a full stop. The host vehicle 102 approaching the obstacle may send an LC Intent message indicating it desires to change lanes. Another vehicle 102 in the lane adjacent to the lane the host vehicle 102 intends to move to, also wants to change lane, resulting in a conflict. The host vehicle 102 sends an LC intent message which is responded to by the remote vehicle 102 by a NACK indicating conflict. The host vehicle 102 sends a subsequent conflict message that conveys the urgency, priority and other relevant parameters to the maneuver. Each of the host and remote vehicles 102 individually uses the same input and algorithm and determines that the host vehicle should go first. The host vehicle 102 sends a reservation message and then proceeds with lane change.

An exception event may also occur, which is analogous to an interruption while vehicles 102 are engaged in a cooperative lane maneuver. Exceptions may be driven by a variety of factors such as, but not limited to (i) traction control loss of one or more participating vehicles 102, (ii) an entering (non-cooperative) vehicle 102 approaching in the road section that is being negotiated, (iii) hard braking or evasive action that participating vehicles 102 have to perform due to sudden appearance of an obstruction. Exception events may abort any on-going cooperative lane change agreements between participating vehicles 102, which will instead default to taking independent decisions on their respective maneuvers. Participating vehicles 102 may then also transmit abort messages to inform neighboring vehicles 102 of this.

Figure 10:
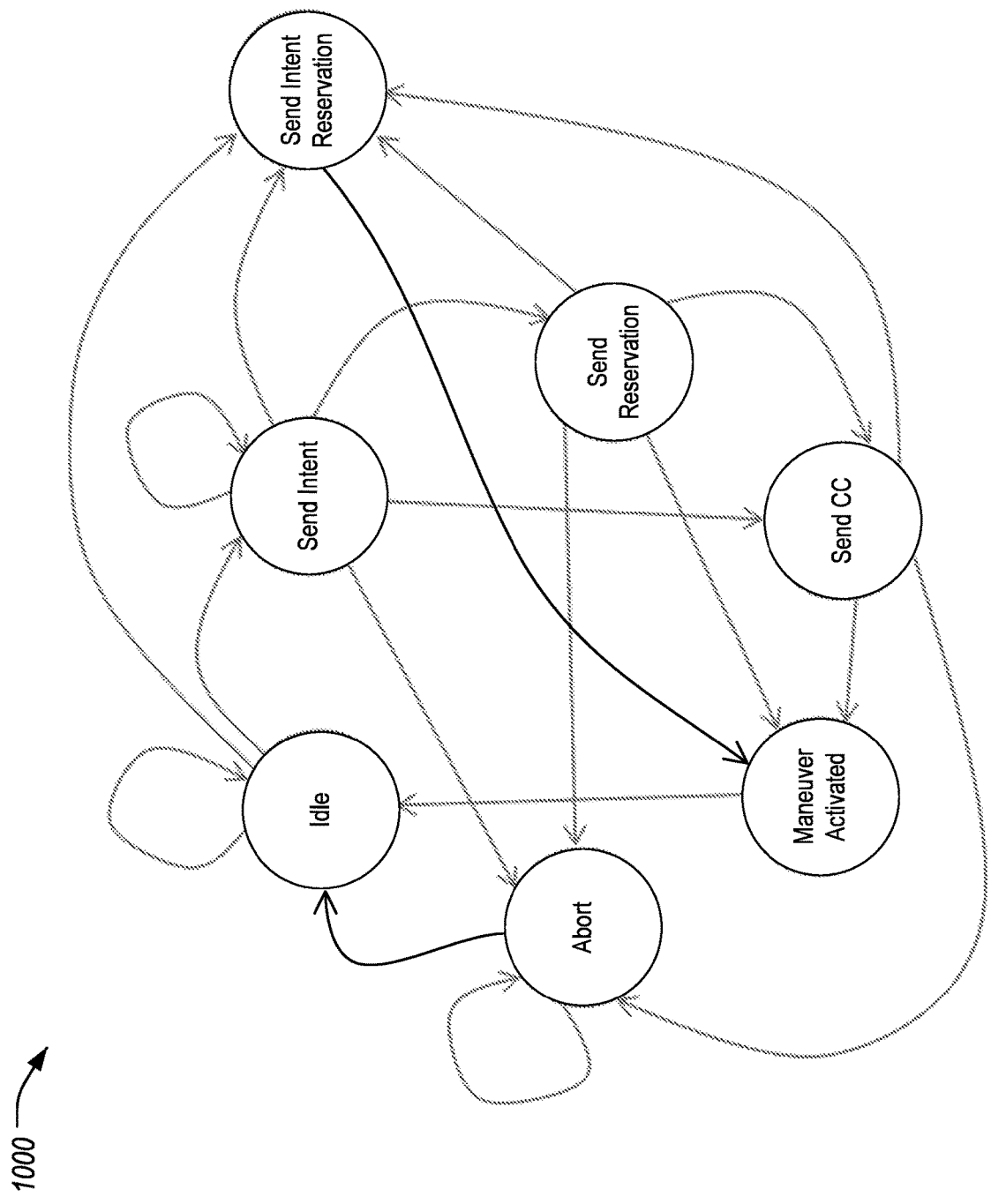
FIG. 10 illustrates an example state machine for the performance of cooperative maneuvers from the perspective of the main traffic participant vehicle.

FIG. 10 illustrates an example state machine 1000 for the performance of cooperative maneuvers from the perspective of the main traffic participant vehicle 102. As shown, the diagram illustrates the states of the vehicle 102 as well as the criteria for transition between the states.

In the IdleState, responsive to receiving a command to initiate a maneuver, the vehicle 102 may, if traffic rules or some other reason prevent performance of a maneuver, remain in the IdleState. In doing so, the vehicle 102 may one or more of check current rules and constraints, assess the state of the road and traffic, and inform the driver or the virtual driver system that the maneuver cannot proceed. If nothing prevents the maneuver from proceeding, the vehicle 102 may enter the SendIntent state. In doing so, the vehicle 102 may one or more of check current rules and constraints, assess the state of the road and traffic, transition to the SendIntent state, start an ACK_NACK_TO timeout, and start a TTM_Timer.

In the SendIntent state, responsive to receiving an ACK message, if only some but not all ACK messages from the vehicles 102 on the ACK list are received, the vehicle 102 may wait and remain in the SendIntent state. If all ACKs have been received, the vehicle 102 may one or more of cancel the ACK_NACK_TO, and transition to the SentReservation state (or possibly keep sending the Reservation until the TTM_timer expires). If, however, the ACK_NACK_TO timeout expires without all of the ACK or NACK from the list being received, the vehicle 102 may one or more of transition to SendIntent, and reset the ACK_NACK_TO timeout.

In the SendReservation state, responsive to expiration of the TTM_Timer, the vehicle 102 transitions to ManeuverActivated. Or, if while in the SendReservation state an abort message is received or the vehicle 102 itself aborts, the vehicle 102 performs one or more of to cancel the TTM_timer, set the AbortTimer, and transition to the AbortState.

In the ManeuverActivated state, responsive to the maneuver being completed, the vehicle 102 does one or more of perform the maneuver, record the performed actions and transition back to the IdleState.

In the AbortState, responsive to receipt of a message from one of the traffic participants, the vehicle 102 may perform one or more of to resend the abort message, reset the AbortTimer, but may remain in the AbortState. Responsive to expiration of the AbortTimer, the vehicle 102 may transition to the IdleState.

Turning to conflict resolution, if, while in the SendIntent state, a NACK is received indicating physical restriction to maneuver (other than conflict), the vehicle 102 may one or more of cancel the TTM_timer, cancel the ACK_NACK_TO timer, and transition to the AbortState. If one NACK message is received indicating conflict, and all ACK/NACK responses have been received, the vehicle 102 may perform one or more of to state the CC_Timer, and transition to the SentCC state. If more than one NACK message is received indicating conflict, the vehicle 102 may perform one or more of to cancel the TTM_Timer, cancel the ACK_NACK_TO timer, and transition to the AbortState. Also, if the TTM_Timer expires, or the vehicle 102 changes intent, the vehicle may also transition to the AbortState.

In the SentCC state, responsive to the vehicle 102 receiving a reservation message indicating that negotiation is completed and in which the vehicle 102 is allocated a road resource/pathway, the vehicle 102 performs one or more of to compute conflict resolution using its algorithm common to the traffic participants, wait for the TTM timer to expire, and transition to the ManeuverActivated state. Responsive to the reservation message indicating that negotiation is completed and the vehicle 102 is not allocated a road resource/pathway, the vehicle 102 performs one or more of to compute conflict resolution using its algorithm common to the traffic participants, delete the CC_Timer, delete the TTM timer, perform the default action and not the maneuver, and transition to the IdleState. If the TTM timer expires without receipt of the reservation message, the vehicle 102 may one or more of reset the CC_Timer, and remain in the SentCC state. If the TTM Timer expires without receipt of the reservation message, the vehicle 102 may transition to the AbortState.

Regardless of state, if a high-priority maneuver event is received, the vehicle 102 may be required to act regardless of negotiation. In such an instance, the vehicle 102 may one or more of abort the current action, cancel any timers, activate a high-priority action timer, and transition to the SentIntentReservation state. In the SentIntentReservation state, responsive to expiration of the high-priority action timer, the vehicle 102 transitions to the ManeuverActivated state to perform the maneuver.

Figure 11:
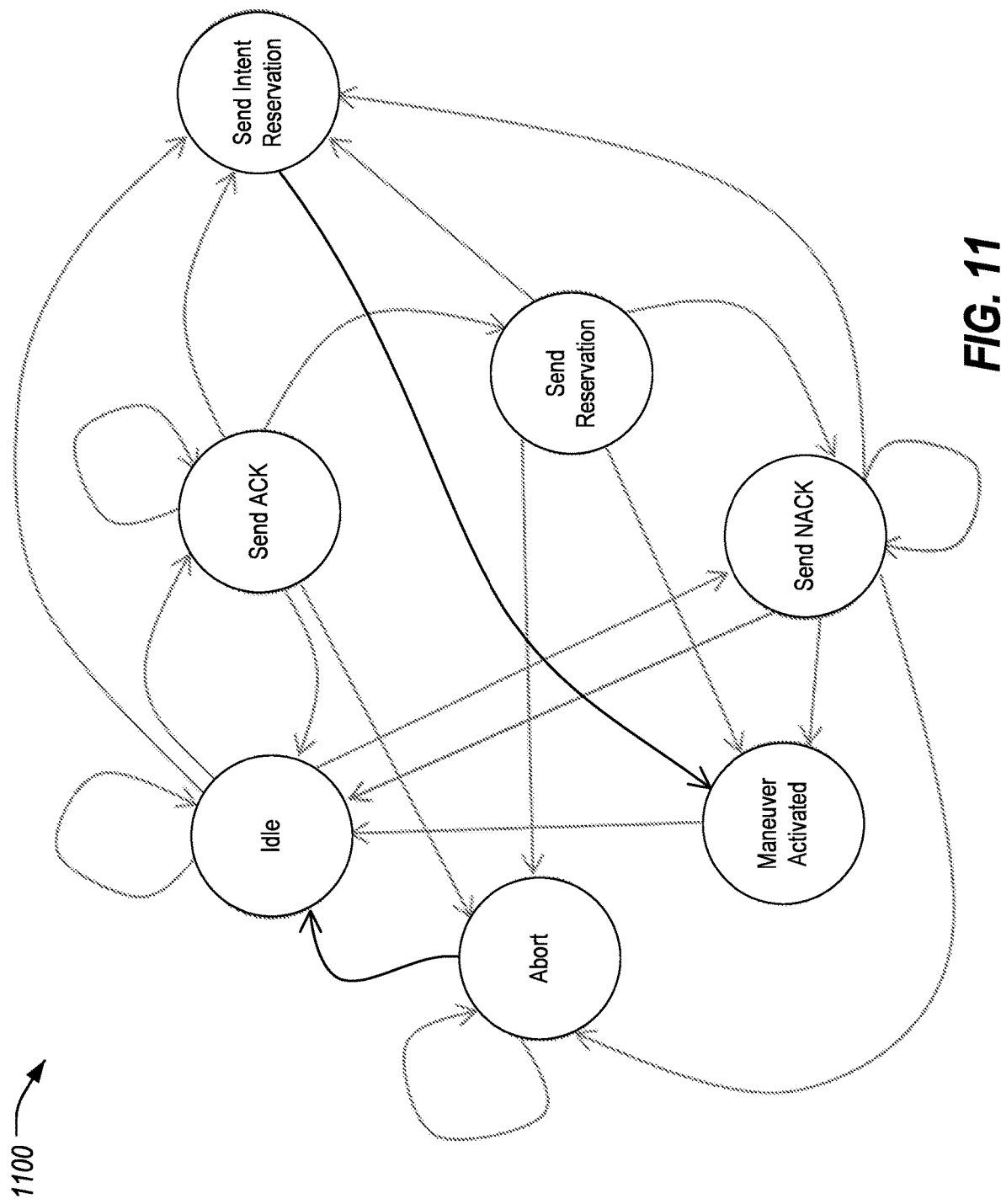
FIG. 11 illustrates an example state machine for the performance of cooperative maneuvers from the perspective of a traffic participant other than the main traffic participant vehicle.

FIG. 11 illustrates an example state machine 1100 for the performance of cooperative maneuvers from the perspective of a traffic participant other than the main traffic participant vehicle 102. As shown, the diagram illustrates the states of the vehicle 102 as well as the criteria for transition between the states.

In the IdleState, responsive to the vehicle 102 receiving an intent to maneuver from the main traffic participant vehicle 102, and the vehicle 102 has no intent to change lane; and the vehicle 102 sees no physical constraint on the maneuver proposed by the main traffic participant vehicle 102, the vehicle 102 may one or more of start the TTM Timer, send an ACK message, and transition to the SendACK state.

In the SendAck state, responsive to the vehicle 102 not receiving the reservation message before expiration of the TTM Timer, the vehicle 102 deletes the TTM Timer and transitions back to the IdleState. Or, responsive to the vehicle 102 receiving another intent message, indicating that a previous ACK message was lost, the vehicle 102 resends the ACK message and remains in the SendAck state. Responsive to receipt of the reservation message, the vehicle 102 may wait for the TTM Timer to elapse and then returns to the IdleState.

Also in the IdleState, responsive to the vehicle 102 receiving an intent to maneuver from the main traffic participant vehicle 102, and the vehicle 102 indicating a physical restriction to movement of the vehicle 102 (other than a conflict), the vehicle 102 sends a NACK message indicating the physical restriction and transitions to the SendNACK state. Also responsive to the vehicle 102 receiving an intent to maneuver from the main traffic participant vehicle 102, and the vehicle 102 indicating a physical restriction to movement of the vehicle 102 (other than a conflict), the vehicle 102 sends a NACK message indicating the conflict and transitions to the SendNACK state.

In the SendNACK state, responsive to the vehicle 102 receiving another intent message indicating that the previous NACK was lost, the vehicle 102 may resend the NACK message, e.g., indicating the physical restriction or conflict as noted above. Responsive to receipt from the main traffic participant vehicle 102 of an abort message, the vehicle 102 may cancel all timers and return to the IdleState. Responsive to expiration of the TTM Timer, the vehicle 102 may also delete the timers and return to the IdleState.

If, however, in the SendNACK state, the vehicle 102 having send a NACK message indicating a conflict and then having received a conflict confirmation message, the vehicle 102 enters conflict resolution. In doing so, the vehicle 102 may one or more of compute the conflict resolution using its algorithm shared among the vehicles 102, send a reservation message, start the CC timer, and transition to the SentReservation state.

In the SentReservation state, responsive to receipt of another conflict confirmation message, the vehicle 102 may infer that the reservation message was lost, and may resend the reservation message, reset the CC timer, and remain in the SentReservation state. Responsive to timeout of the CC timer, negotiation for the conflict being completed, and the vehicle 102 not receiving a road resource or pathway, the vehicle 102 one or more of waits for the TTM timer to expire, deletes the timers, and returns to the IdleState. Responsive to timeout of the CC timer, negotiation for the conflict being completed, and the vehicle 102 receiving a road resource or pathway, the vehicle 102 waits for the TTM timer to expire. Responsive to expiration of the TTM timer, the vehicle 102 having received the road resource or pathway, the vehicle 102 transitions to ManeuverActivated to perform the maneuver.

In the ManeuverActivated state, responsive to the maneuver being completed, the vehicle 102 does one or more of perform the maneuver, record the performed actions and transition back to the IdleState.

Regardless of state, if a high-priority maneuver event is received, the vehicle 102 may be required to act regardless of negotiation. In such an instance, the vehicle 102 may one or more of abort the current action, cancel any timers, activate a high-priority action timer, and transition to the SentIntentReservation state. In the SentIntentReservation state, responsive to expiration of the high-priority action timer, the vehicle 102 transitions to the ManeuverActivated state to perform the maneuver.

Also regardless of state, if an exception occurs requiring the vehicle 102 to opt-out, the vehicle 102 sends an abort message and transitions to the AbortState. In the AbortState, the vehicle 102 may await expiration of the AbortTimer and transition to the IdleState.

Figure 12:
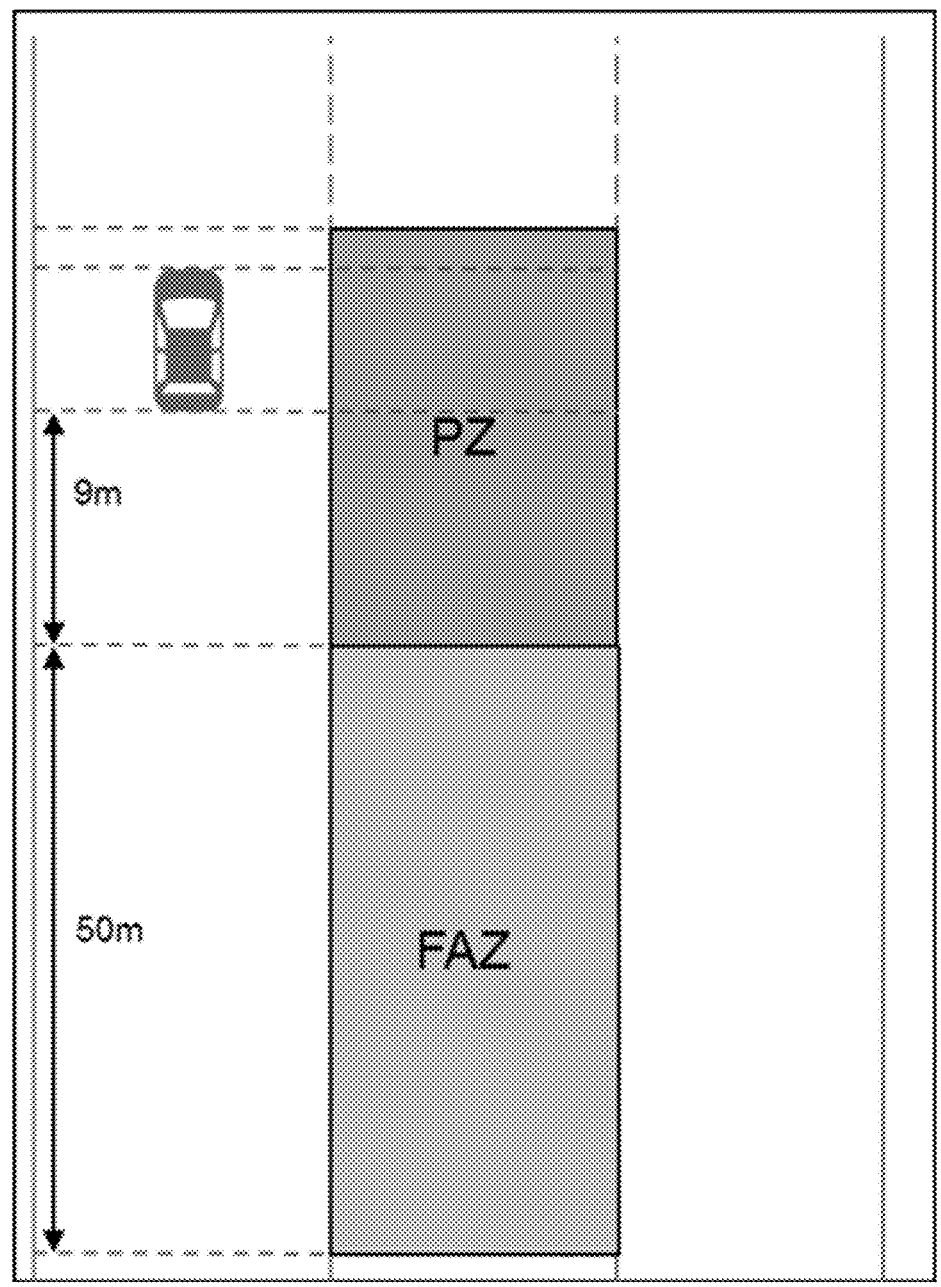
FIG. 12 illustrates an example diagram of traffic zones that are pertinent to lane changes or other traffic maneuvers.

FIG. 12 illustrates an example diagram 1200 of traffic zones that are pertinent to lane changes or other traffic maneuvers. These include a fast approach zone (FAZ) as well as a proximity zone (PZ). The FAZ may refer to an area in the adjacent lane from 30 to 162 ft (~9 m-50 m) behind the rear bumper of the vehicle 102, while the PZ may refer to an area in the adjacent lane from 4 ft (1.2 m) in front of the front bumper of the vehicle to 30 ft (9 m) behind the rear bumper of the vehicle 102. The PZ area generally includes the blind spot and the area beside and behind the vehicle 102. The most common lane-change incidents appear to be those occurring in the PZ. Both the PZ and the FAZ refer to areas that should be monitored before lane-change initiation.

Another determining factor in defining the negotiation zone is the time it takes to complete negotiation and the actual maneuver. Over many examples, lane-change duration has been studied to be between 1.0 second to 13 seconds, with a mean of 4.6 seconds. Note that this is contrary to the assumed fixed duration of 1.5 seconds typically assumed for the actual maneuver. Considering these values, denoting the maneuver time by $T_M$, and the preceding negotiation period by $T_N$, the total time for planning and executing a lane change is $T_M+T_N$. During this period, it is envisioned that a vehicle 102 would have access to a fixed snapshot of the road dynamics, i.e., no unforeseen vehicles 102 entering the scene and preventing lane change, no sudden accelerations or slowdowns of the neighboring vehicles 102, etc.

Assume, for sake of example, a 5 seconds lane change duration, and a 1.5 second negotiation period that precedes the maneuver. Note that 1.5 seconds of negotiation is approximated by a 4-way handshake (2 Round Trip Times (RTT)), and assuming each RTT to be 300 msecs (which is a large RTT and incorporates high queuing and processing delay). This results in 600 msec negotiation time. Accounting for retransmission of lost packets and considering margins, 1.5 seconds should be sufficiently large to accommodate all signaling preceding any maneuver.

This sums to a 6.5 seconds period, during which ideally no changes occur in the surrounding dynamics, i.e., no unforeseen traffic participant to enter the negotiation zone. Thus, a vehicle 102 that is more than 6.5 seconds distant from the main traffic participant vehicle 102 can be excluded from the negotiation, i.e., is out of the negotiation zone. Note that the above calculation does not consider the case of heavy vehicles 102 whose lane change takes longer. For light-weight vehicles 102 in highway scenarios at speed of 80 mph (130 km/h=36 m/sec), 6.5 seconds of headway amounts to 234 meters. At urban scenarios with speed of 40 mph, this headway would be less than 120 meters.

Based on the above two constraints, the negotiation zone should be defined to include at least the PZ. It is reasonably required for it to also include FAZ. Furthermore, depending on the type of the vehicle 102 changing lane (e.g., heavy load vehicle 102 versus lighter passenger vehicles 102) and the duration of lane change, another zone boundary may be determined based on the amount of notification time required ahead of lane change.

Figure 13:
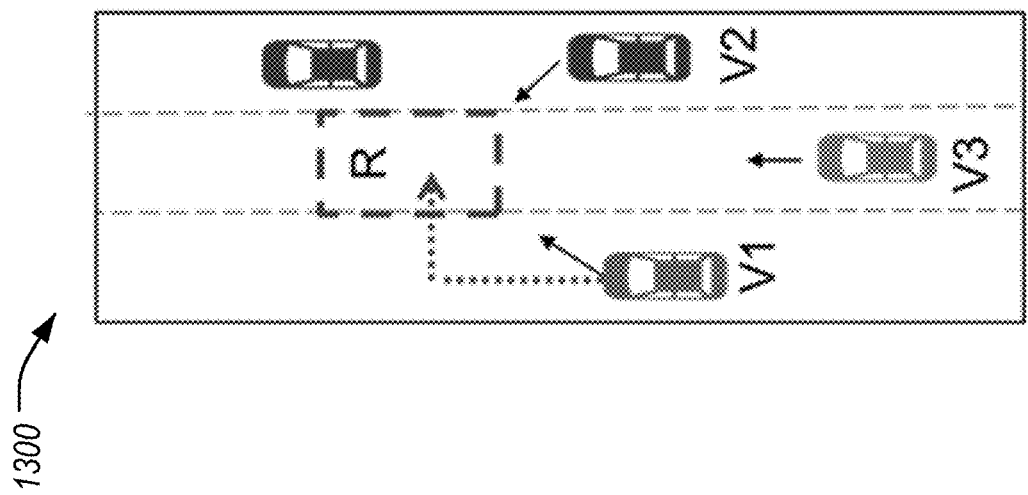
FIG. 13 illustrates an example diagram of a lane merge in the presence of a vehicle behind scenario.

FIG. 13 illustrates an example diagram 1300 of a lane merge in the presence of a vehicle 102 behind scenario. As shown, the vehicle 102 V1 intends to change lanes to the middle lane, and negotiates this move with vehicle 102 V2 ahead of time. However vehicle 102 V3 that was previously outside the negotiation zone is approaching R rapidly, moving at a speed faster than V1. For V3 to maintain a distance with V1 after its lane change to the middle lane, V3 should have a headway of about 2 seconds to V1.

A vehicle may use the dimensions of PZ and FAZ with available kinematics from BSMs of other vehicles to estimate overlap with their future locations. Once a zone is defined based on the considerations discussed above, the newly occupied road resource R should have sufficient distance to V3. If one of the following conditions holds, Vx (the vehicle—either V1 or V2—winning R and changing lane) may either (a) abort lane change, (b) speed up after changing lane, (c) speed up before changing lane, or (d) request V3 to decrease its speed before Vx's lane change or (e) request V3 to decrease its speed after Vx's lane change. These methods (a) through (e) are discussed in further detail with respect to the following examples.

Upon lane change, the PZ of Vx may overlap with the PZ of V3. In this case, R should not be considered a viable road resource for lane change. As V3 is in the negotiation zone of V1 and V2, V3 is part of the negotiation protocol, after receiving intent, the maneuver is not possible in the given conditions. Thus, one of the methods enumerated above (a) through (e) may be used (if feasible): e.g., using (a), V3 should respond with a NACK (of constraint type) and the maneuver be aborted, or using (d), if V3 is not already moving at the minimum allowed speed, V3 may send an ACK and decelerate to create a gap between itself and R that keeps R out of PZ.

In may be that the FAZ of Vx overlaps with the PZ of V3. If staying clear of both PZ and FAZ is required, like the previous case, this is not allowed. If partial FAZ overlap is allowed, depending on what is considered a suitable distance between two vehicles 102 (e.g., 2 second headway, or allowing a specific partial overlap with FAZ), this case may be allowed. If the distance between R and V3 is smaller than the suitable distance allowed, one of the methods (a) through (e) may be taken. For example:

If $d(V3, R) < d_{min}$, one of the following may be decided. Based on (a), R should not be considered a valid road resource for lane change. As V3 is in the negotiation zone of V1 and V2, V3 is part of the negotiation protocol, after receiving intent, V3 should respond with a NACK (of constraint type). Based on the method (b) mentioned above, Vx needs to speed up after lane change to reach $d_{min}$ between itself and V3, where $d_{min}$ is the minimum allowed distance between two vehicles. Based on the method (d) mentioned above, if possible, (V3 not already going at minimum allowed speed), V3 may send an ACK and decelerate to create a gap between itself and R that keeps required inter-distance $d_{min}$.

If the velocity of V3 is greater than that of Vx (the vehicle winning R and changing lane), one of the previously named options may be taken. For example, using the method (b) mentioned above, Vx speeds up after lane change if possible/feasible.

Using the method (d) mentioned above, if possible, (V3 not already going at maximum allowed speed), V3 may send an ACK and decelerate to create a gap between itself and R that keeps required inter-distance d_min.

FIG. 14 illustrates an example diagram 1400 of a lane change in the presence of a vehicle 102 ahead scenario. As shown, in the scenario there is a vehicle V3 ahead of V1 and V2. For a lane change by one of V1 and V2 to change lanes, the newly-occupied road resource R should have sufficient distance to V3.

If one of the following conditions holds, Vx (the vehicle—either V1 or V2—winning R and changing lane) may either (a) abort lane change, (b) slow down after changing lane, (c) slow down before changing lane, (d) request V3 to increase its speed before Vx's lane change, or (e) request V3 to increase its speed after Vx's lane change.

In the situation where the PZ of V3 overlaps with R. R should not be considered a viable road resource for lane change. As V3 is in the negotiation zone of V1 and V2. V3 is part of the negotiation protocol. After receiving the LC Intent message, the maneuver is not possible in the given conditions. Thus, one of the 5 methods enumerated above (a) through (e) may be used (if feasible): e.g., using (a), V3 should respond with a NACK (of constraint type) and the maneuver be aborted, or using (d), if V3 not already moving at the maximum allowed speed, V3 may send an ACK and accelerate to create a gap between itself and R that keeps R out of PZ.

In the situation where the FAZ of V3 overlaps with R, if staying clear of both PZ and FAZ is desired, as in the previous case, the maneuver is not allowed. If a partial FAZ overlap is allowed, depending on what is considered an adequate distance between two vehicles 102 (e.g., 2 second headway, or allowing a specific partial overlap with FAZ), this case may be allowed. If the distance between R and V3 is smaller than the suitable distance allowed, one of the methods (a) through (e) may be taken. For example If $d(V3, R) < d_{min}$, one of the following may be decided. Based on (a), R should not be considered a valid road resource for lane change. As V3 is in the negotiation zone of V1 and V2, V3 is part of the negotiation protocol, after receiving intent, V3 should respond with a NACK (of constraint type). Based on the method (b) mentioned above, if feasible Vx slows down after the lane change to reach $d_{min}$ between itself and V3, where $d_{min}$ is the minimum allowed distance between two vehicles. Based on the method (d), if possible, (V3 not already going at maximum allowed speed), V3 may send an ACK and accelerate to create a gap between itself and R that keeps required inter-distance $d_{min}$.

In the case where the velocity of V3 is smaller than that of Vx (the vehicle winning R and changing lane), one of the previously named options may be taken. For example, using (b), Vx needs to slow down after lane change. Or, using (d), if possible, (V3 not already going at maximum allowed speed), V3 may send an ACK and accelerate to create a gap between itself and R that keeps required inter-distance $d_{min}$.

The minimum distance $d_{min}$ may be defined as PZ, or PZ+FAZ, or PZ and part of FAZ. The negotiation zone may be selected symmetrically for vehicles 102 ahead and vehicles 102 behind the main traffic participant vehicle 102 V1. For example, as shown in the diagram 1400, with regard to a lane merge in presence of a vehicle 102 behind wherein a vehicle more than 6.5 seconds away and behind main participant is out of the negotiation zone, the same margin of 6.5 seconds may be enforced for vehicles 102 ahead. It should also be noted that $d_{min}$ may be selected such that it does not impose a tighter constraint than the negotiation zone. If $d_{min}$ extends beyond the negotiation zone, V3 is excluded from negotiation zone, and thus would not send an ACK or NACK, or take any action to accommodate the lane change for Vx.

FIG. 15 illustrates an example diagram 1500 of a lane change in the presence of a vehicle ahead and behind scenario. In the general case, there are typically vehicles 102 both ahead and behind the main traffic participant vehicle 102 (in this example the vehicle 102 V1). In this case, both vehicles V3 and V4 may be part of the negotiation. If the road resource R overlaps with the zones considered for one of V3 and V4, as a result of negotiation, a gap may be created by V3 and V4 to allow sufficient space for V1 or V2 to perform a lane change maneuver. For example, V4 may agree to slow down to accommodate a merge, and/or V3 may agree to speed up. The options available for the traffic participants in this case are the feasible set of combinations of options (a) to (e) for the vehicle ahead, and their parallels for the vehicle 102 behind.

Figure 16:
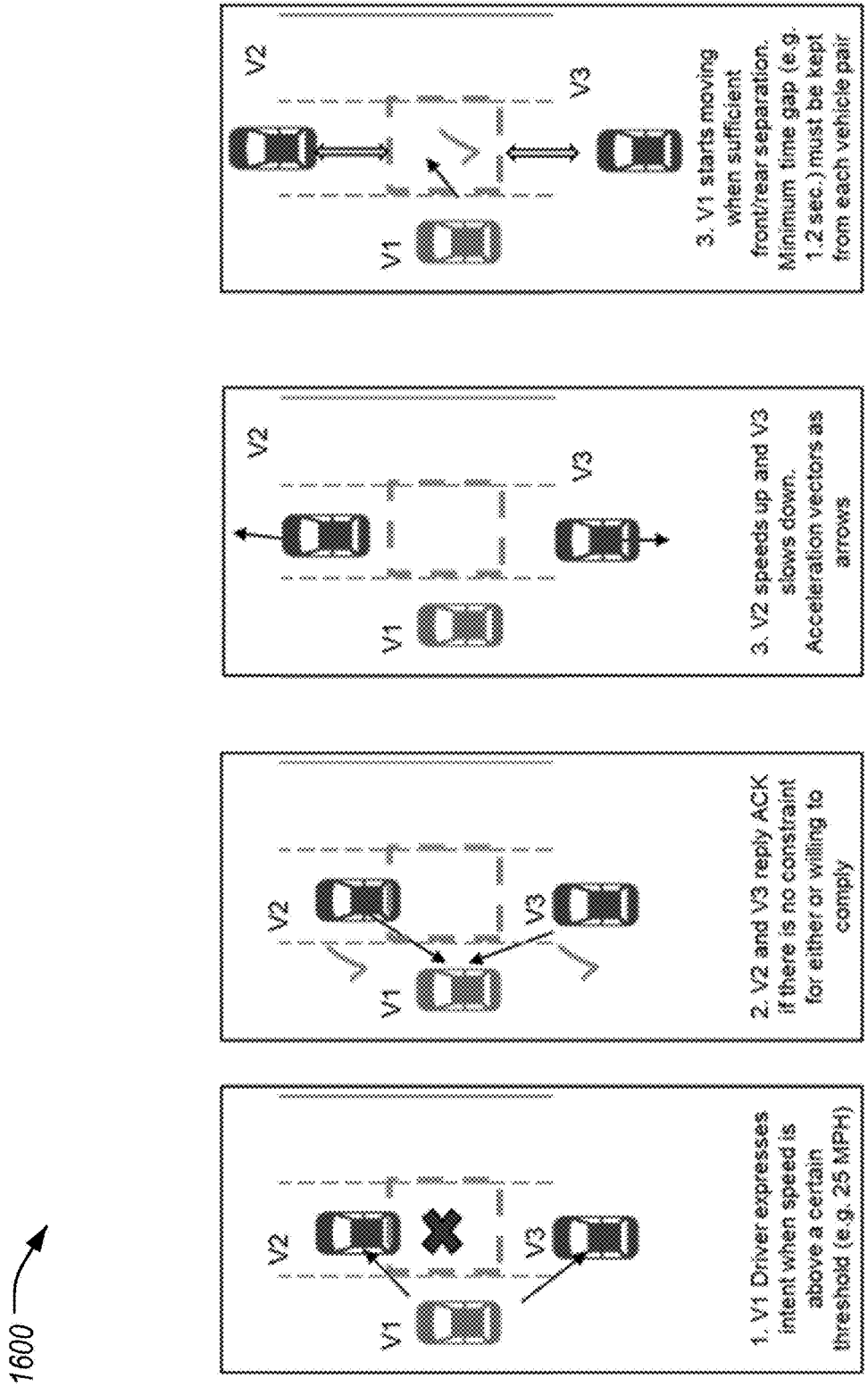
FIG. 16 illustrates an example diagram of a negotiated gap creation in road resource allocation scenario.

FIG. 16 illustrates an example diagram 1600 of a negotiated gap creation in road resource allocation scenario. As shown, another approach to making maneuvers is to negotiate for sufficiently wide gaps between vehicles 102. Considerations for adaptive cruise control presume a time gap margin. A time gap margin is the current speed of the vehicle 102 times a nominal reaction and deceleration time (e.g., at 70 MPH with 1.2 sec gap is about 37 m). Such vehicles 102 may also change their lanes. At higher speeds, the time gap distance thus becomes larger. A use case may activate when the vehicle 102 is above a certain speed. If either V2 or V3 sends a NACK, the exception requires an abort message. At most, two vehicles 102 may define bounds of the conflict region. Otherwise, considering more than two the complexity of the road resource allocation problem scales rapidly. Thus each cooperating vehicle 102 may ask for two more vehicles 102 to make an appropriate gap. In some examples, only one cooperating vehicle 102 may be utilized to initiate a gap creation maneuver. V2 and V3 may not only use speed adjustment, but they may also change lanes to assist in gap creation.

Figure 17:
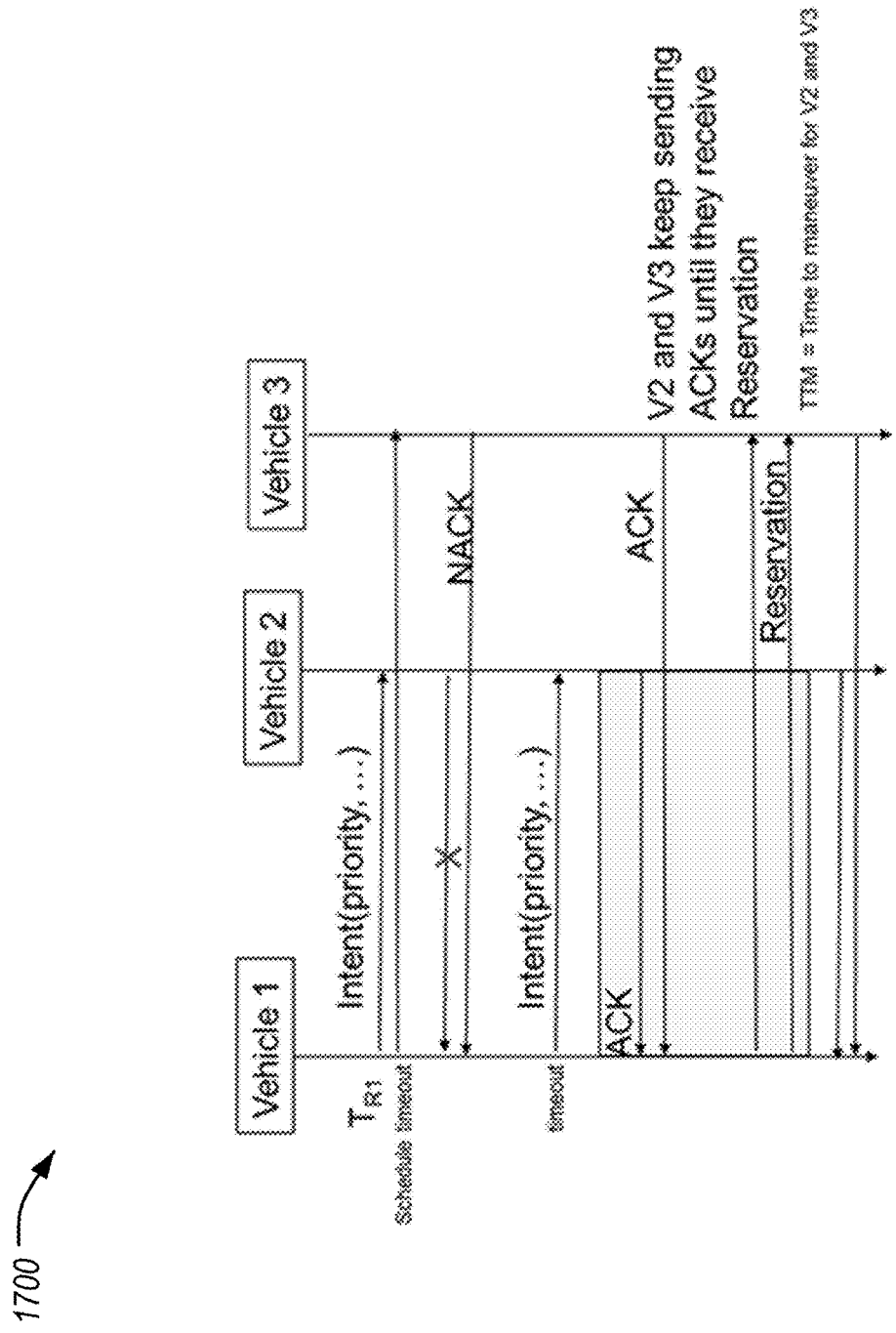
FIG. 17 illustrates an example message flow for performance of the negotiated gap creation.

FIG. 17 illustrates an example message flow 1700 for performance of the negotiated gap creation. In one possible approach, vehicles 102 V2 and V3 send a maneuver completion message to let V1 begin moving in the gap (it is not relevant to V2 and V3 what V1 does in the meantime). In another possible approach, BSMs or other connected messages 120 may be used to facilitate judgment for maneuvering. For instance, V1 may start a maneuver whenever it detects that a sufficient gap has opened up.

Variations on the described examples are possible. In one example, a RSU may perform one or more of the roles described herein as being performed by the vehicles 102. For instance, the handshaking may adapt such that responsive to a main traffic participant vehicle 102 V1 sending a request, the RSU assigns the request and designates a road resource. As another possibility, if multiple vehicles send a request for a road resource within a short timeframe, the RSU may assign non-overlapping road resources to the multiple vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle for performing traffic maneuvers, comprising: one or more controllers programmed to broadcast, from the vehicle to one or more recipient vehicles, a lane change intent message, the lane change intent message indicating parameters of a maneuver to be performed by the vehicle operating as a main traffic participant vehicle, the maneuver requiring use of a road resource;

responsive to the lane change intent message being an urgent lane change intent message, the urgent lane change intent message indicating parameters of the maneuver to be performed by the vehicle operating as the main traffic participant vehicle, the maneuver requiring use of a road resource, the urgent lane change intent message further including a reservation of the road resource regardless of conflicts of the recipient vehicles, the urgent lane change intent message thereby indicating both intent and reservation;

responsive to the lane change intent message not being an urgent lane change intent message:

receive, from the one or more recipient vehicles, one or more respective response messages indicating approval or disapproval of performance of the maneuver;

responsive to the response messages all indicating approval of the maneuver, send a reservation message to the one or more recipient vehicles indicating that the main traffic participant vehicle is to perform the maneuver utilizing the road resource; and responsive to one of the recipient vehicles returning a response message indicating conflict with use of the road resource and a plurality of pathways to use as options for performance of the maneuver, perform a conflict resolution procedure between the main traffic participant vehicle and the conflicted recipient vehicle, including to send a conflict confirmation message indicating which one of the plurality of pathways is to be used by the main traffic participant vehicle to perform the maneuver; and autonomously control the vehicle to perform the maneuver responsive to the vehicle having reservation and/or approval to perform the maneuver.

2. The vehicle of claim 1, wherein the lane change intent message includes urgency information with respect to the main traffic participant vehicle, the response message indicating conflict with use of the road resource includes urgency information with respect to the conflicted recipient vehicle, and the conflict resolution algorithm accounts for the urgency information to determine relative need of the main traffic participant vehicle and the conflicted recipient vehicle to perform the maneuver.

3. The vehicle of claim 1, wherein the response message includes parameters of intended movement of the one of the recipient vehicles, and the one or more controllers are further programmed to use, as inputs to make the distributed decision whether to proceed with the maneuver, the parameters of the maneuver to be performed by the main traffic participant vehicle and the parameters of the intended movement of the one of the recipient vehicles.

4. The vehicle of claim 1, wherein the one or more controllers are further programmed to:

responsive to receipt of the response message indicating conflict with use of the road resource, send a conflict confirmation message including inputs to be used by the conflict resolution algorithm;

responsive to the conflict resolution algorithm deciding in favor of the main traffic participant vehicle, receive, from the conflicted recipient vehicle a reservation message confirming that the main traffic participant vehicle is to utilize the road resource required for performance of the maneuver; and responsive to the conflict resolution algorithm deciding in favor of the conflicted recipient vehicle, receive, from the conflicted recipient vehicle, a reservation message confirming that the main traffic participant vehicle is not to utilize the road resource required for performance of the maneuver.

5. The vehicle of claim 1, wherein the one or more controllers are further programmed to:

receive, from the conflicted recipient vehicle, a reservation message confirming which one of the plurality of pathways is to be used by the main traffic participant vehicle to perform the maneuver.

6. The vehicle of claim 1, wherein the one or more controllers are further programmed to:

include, in the lane change intent message, a list of identifiers of the one or more recipient vehicles required to respond to approve the maneuver, the one or more recipient vehicles being determined according to vehicle location information received from the one or more recipient vehicles; and responsive to failing to receive response messages within a predefined timeout period from each of the one or more recipient vehicles in the list, abort performance of the maneuver.

7. The vehicle of claim 1, wherein the conflict resolution procedure uses the pre-agreed identical conflict resolution algorithm executed on each of the main traffic participant vehicle and the conflicted recipient vehicle to each make the same distributed decision whether to proceed with the maneuver using a set of inputs that is the same for each of the main traffic participant vehicle and the conflicted recipient vehicle.

8. The vehicle of claim 7, wherein the one or more controllers are further programmed to:

responsive to receipt of the response message indicating conflict with use of the road resource, send a conflict confirmation message including a list of the inputs used in performing the conflict resolution algorithm.

9. A vehicle for performing traffic maneuvers, comprising: one or more controllers programmed to receive, from a main traffic participant vehicle as a recipient vehicle, a lane change intent message, the lane change intent message indicating parameters of a maneuver to be performed by the main traffic participant vehicle, the maneuver requiring use of a road resource;

responsive to the lane change intent message being an urgent lane change intent message, the urgent lane change intent message indicating parameters of the maneuver to be performed by the main traffic participant vehicle, the maneuver requiring use of a road resource, the urgent lane change intent message further including a reservation of the road resource regardless of conflicts of the recipient vehicle, maneuver to avoid use of the road resource;

responsive to the lane change intent message not being an urgent lane change intent message and further responsive to the road resource being required by the recipient vehicle, perform a conflict resolution procedure between the main traffic participant vehicle and the conflicted recipient vehicle including to:

send a response message indicating conflict with use of the road resource, the response message including a plurality of pathways to use as options for performance of the maneuver;

receive a conflict confirmation message indicating which one of the plurality of pathways is to be used by the main traffic participant vehicle to perform the maneuver; and send, to the main traffic participant vehicle, a reservation message indicating which one of the plurality of pathways is to be used by the main traffic participant vehicle to perform the maneuver; and autonomously control the vehicle to perform the maneuver responsive to the vehicle having reservation and/or approval to perform the maneuver.

10. The vehicle of claim 9, wherein the lane change intent message includes urgency information with respect to the main traffic participant vehicle, the conflicted recipient vehicle provides urgency information with respect to the conflicted recipient vehicle, and the conflict resolution algorithm accounts for the urgency information to determine relative need of the main traffic participant vehicle and the conflicted recipient vehicle to perform the maneuver.

11. The vehicle of claim 9, wherein the one or more controllers are further programmed to:
send a response message including parameters of intended movement of the recipient vehicle; and
use, as inputs to make the distributed decision whether to proceed with the maneuver, the parameters of the maneuver to be performed by the main traffic participant vehicle and the parameters of intended movement of the recipient vehicles.

12. The vehicle of claim 9, wherein the one or more controllers are further programmed to:
receive a conflict confirmation message including inputs to be used by the conflict resolution algorithm responsive to sending a response message indicating conflict with use of the road resource;
responsive to the conflict resolution algorithm deciding in favor of the main traffic participant vehicle, send, to the main traffic participant vehicle, a reservation message confirming that the main traffic participant vehicle is to utilize the road resource required for performance of the maneuver; and
responsive to the conflict resolution algorithm deciding in favor of the conflicted recipient vehicle, send, to the main traffic participant vehicle, a reservation message confirming that the main traffic participant vehicle is not to utilize the road resource required for performance of the maneuver.

13. The vehicle of claim 9, wherein the one or more controllers are further programmed to:
responsive to sending, to the main traffic participant vehicle, a response message indicating conflict with use of the road resource and including a plurality of pathways to use as options for performance of the maneuver, receive a conflict confirmation message from the main traffic participant vehicle indicating which one of the plurality of pathways is to be used by the main traffic participant vehicle to perform the maneuver; and
send, to the main traffic participant vehicle, a reservation message indicating which one of the plurality of pathways is to be used by the main traffic participant vehicle to perform the maneuver.

14. The vehicle of claim 9, wherein the one or more controllers are further programmed to:
identify, in the lane change intent message, a list of identifiers of the one or more recipient vehicles required to respond to approve the maneuver, the one or more recipient vehicles being determined according to vehicle location information received from the one or more recipient vehicles; and
respond to the lane change intent message with a response message responsive to the list of identifiers including an identifier of the recipient vehicle.

15. A method for performing traffic maneuvers, comprising:
broadcasting, from a vehicle to one or more recipient vehicles, a lane change intent message, the lane change intent message indicating parameters of a maneuver to be performed by the vehicle operating as a main traffic participant vehicle, the maneuver requiring use of a road resource;
responsive to the lane change intent message being an urgent lane change intent message, the lane change intent message indicating parameters of the maneuver to be performed by the vehicle operating as the main traffic participant vehicle, the maneuver requiring use of a road resource, the urgent lane change intent message further including a reservation of the road resource regardless of conflicts of the recipient vehicles, utilizing the urgent lane change intent message to indicate both intent and reservation;
responsive to the lane change intent message not being an urgent lane change intent message:
receiving, from the one or more recipient vehicles, one or more respective response messages indicating approval or disapproval of performance of the maneuver;
responsive to the response messages all indicating approval of the maneuver, sending a reservation message to at least the one or more recipient vehicles indicating that the main traffic participant vehicle is to perform the maneuver utilizing the road resource; and
responsive to one of the recipient vehicles returning a response message indicating conflict with use of the road resource required for performance of the maneuver and a plurality of pathways to use as options for performance of the maneuver, performing a conflict resolution procedure between the main traffic participant vehicle and the conflicted recipient vehicle, including to send a conflict confirmation message indicating which one of the plurality of pathways is to be used by the main traffic participant vehicle to perform the maneuver; and
autonomously controlling the vehicle to perform the maneuver responsive to the vehicle having reservation and/or approval to perform the maneuver.

16. The method of claim 15, wherein the lane change intent message includes urgency information with respect to the main traffic participant vehicle, the response message indicating conflict with use of the road resource includes urgency information with respect to the conflicted recipient vehicle, and the conflict resolution algorithm accounts for the urgency information to determine relative need of the main traffic participant vehicle and the conflicted recipient vehicle to perform the maneuver.

17. The method of claim 15, wherein the response message includes parameters of intended movement of the one of the recipient vehicles, further comprising using, as inputs to make the distributed decision whether to proceed with the maneuver, the parameters of the maneuver to be performed by the main traffic participant vehicle and the parameters of intended movement of the one of the recipient vehicles.

18. The method of claim 15, further comprising:
responsive to receipt of the response message indicating conflict with use of the road resource, sending a conflict confirmation message including inputs to be used by the conflict resolution algorithm;
responsive to the conflict resolution algorithm deciding in favor of the main traffic participant vehicle, receiving, from the conflicted recipient vehicle a reservation message confirming that the main traffic participant vehicle is to utilize the road resource required for performance of the maneuver; and
responsive to the conflict resolution algorithm deciding in favor of the conflicted recipient vehicle, receiving, from the conflicted recipient vehicle, a reservation message confirming that the main traffic participant vehicle is not to utilize the road resource required for performance of the maneuver.

19. The method of claim 15, further comprising:
receiving, from the conflicted recipient vehicle, a reservation message indicating which one of the plurality of pathways is to be used by the main traffic participant vehicle to perform the maneuver.

20. The method of claim 15, further comprising:
including, in the lane change intent message, a list of identifiers of the one or more recipient vehicles required to respond to approve the maneuver, the one or more recipient vehicles being determined according to vehicle location information received from the one or more recipient vehicles; and responsive to failing to receive response messages within a predefined timeout period from each of the one or more recipient vehicles in the list, aborting performance of the maneuver.

21. The method of claim 15, wherein the conflict resolution procedure executed on each of the main traffic participant vehicle and the conflicted recipient vehicle utilizes a common time reference for synchronization based on a common clock available to the main traffic participant vehicle and the conflicted recipient vehicle through global navigation satellite system (GNSS) messages.

\* \* \* \* \*